US012769243B2

(12) United States Patent
Makisumi et al.

(10) Patent No.: US 12,769,243 B2
(45) Date of Patent: Oct. 20, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kohei Makisumi, Shizuoka (JP); Shuntaro Watanabe, Kanagawa (JP); Nao Higuchi, Shizuoka (JP); Kentaro Tanaka, Shizuoka (JP); Masatada Hirota, Shizuoka (JP); Taichi Sato, Shizuoka (JP); Tomohito Ishida, Shizuoka (JP); Tsutomu Nishida, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 19/221,333

(22) Filed: May 28, 2025

(65) Prior Publication Data

US 2025/0291308 A1 Sep. 18, 2025

Related U.S. Application Data

(63) Continuation of application No. PCT/JP2023/042203, filed on Nov. 24, 2023.

(30) Foreign Application Priority Data

Nov. 30, 2022 (JP) ................................ 2022-192038
Apr. 26, 2023 (JP) ................................ 2023-072649

(51) Int. Cl.
*G03G 15/00* (2006.01)
*G03G 5/00* (2006.01)
(Continued)

(52) U.S. Cl.
CPC .......... *G03G 15/751* (2013.01); *G03G 5/147* (2013.01); *G03G 5/14704* (2013.01); *G03G 7/0006* (2013.01); *G03G 7/0013* (2013.01)

(58) Field of Classification Search
CPC ...... G03G 5/14; G03G 5/147; G03G 5/14704; G03G 5/14708; G03G 5/14756;
(Continued)

(56) References Cited

U.S. PATENT DOCUMENTS

2009/0208246 A1 8/2009 Kami
2016/0378000 A1* 12/2016 Nishi .................... G03G 5/142 430/56
2019/0094723 A1 3/2019 Kuramochi
2023/0288826 A1* 9/2023 Nakazono ........... G03G 5/0507
(Continued)

FOREIGN PATENT DOCUMENTS

EP 2093618 A1 8/2009
JP H08234471 A 9/1996
(Continued)

*Primary Examiner* — Robert B Beatty
(74) *Attorney, Agent, or Firm* — Canon U.S.A., Inc. IP Division

(57) ABSTRACT

An electrophotographic photosensitive member in which durability is improved by suppressing detachment of particles from a surface layer while transferability is improved. The electrophotographic photosensitive member is an electrophotographic photosensitive member including a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a
(Continued)

scanning probe microscope, satisfy the following formulae (i) and (ii), 30≤Rmkmax≤70 . . . (i) and 100≤Lmax≤500 . . . (ii).

11 Claims, 5 Drawing Sheets

(51) Int. Cl.
*G03G 5/147* (2006.01)
*G03G 7/00* (2006.01)

(58) Field of Classification Search
CPC ............ G03G 5/14752; G03G 7/0006; G03G 7/0013; G03G 7/002; G03G 15/751
USPC .... 399/159; 430/66, 67, 271.1, 272.1, 273.1
See application file for complete search history.

(56) References Cited

U.S. PATENT DOCUMENTS

| | | | | |
|---|---|---|---|---|
| 2024/0004322 | A1* | 1/2024 | Makisumi | G03G 5/087 |
| 2025/0208527 | A1* | 6/2025 | Higuchi | G03G 5/087 |
| 2025/0284237 | A1* | 9/2025 | Saito | G03G 5/147 |
| 2025/0291266 | A1* | 9/2025 | Higuchi | G03G 5/147 |

FOREIGN PATENT DOCUMENTS

| | | | | |
|---|---|---|---|---|
| JP | 2009223302 | A | | 10/2009 |
| JP | 2012014091 | A | | 1/2012 |
| JP | 2012108487 | A | | 6/2012 |
| JP | 2012203403 | A | | 10/2012 |
| JP | 2012247605 | A | | 12/2012 |
| JP | 2013015823 | A | * | 1/2013 |
| JP | 2014178424 | A | | 9/2014 |
| JP | 2017194545 | A | | 10/2017 |
| JP | 2019061061 | A | | 4/2019 |

* cited by examiner

ELECTROPHOTOGRAPHIC PHOTOSENSITIVE MEMBER, PROCESS CARTRIDGE, AND ELECTROPHOTOGRAPHIC APPARATUS

CROSS-REFERENCE TO RELATED APPLICATIONS

This application is a Continuation of International Patent Application No. PCT/JP2023/042203, filed Nov. 24, 2023, which claims the benefit of Japanese Patent Application No. 2022-192038, filed Nov. 30, 2022, and Japanese Patent Application No. 2023-072649, filed Apr. 26, 2023, all of which are hereby incorporated by reference herein in their entirety.

BACKGROUND OF THE INVENTION

Field of the Invention

The present invention relates to an electrophotographic photosensitive member, and a process cartridge and an electrophotographic apparatus each including the electrophotographic photosensitive member.

Description of the Related Art

As an electrophotographic photosensitive member (hereinafter also referred to as "photosensitive member") to be mounted onto an electrophotographic apparatus, there is widely used an electrophotographic photosensitive member containing an organic photoconductive material serving as a charge-generating material. In recent years, an improvement in mechanical durability, that is, abrasion resistance of the electrophotographic photosensitive member has been required for the purposes of lengthening a lifetime of the electrophotographic photosensitive member and improving image quality at the time of its repeated use.

One of steps to be performed by the electrophotographic apparatus is a transferring step. In the step, efficient movement of toner with which a latent image on the surface of the photosensitive member has been developed to a medium, such as paper or an intermediate transfer member, without any waste is required. To transfer the toner with which the latent image on the photosensitive member has been developed onto the medium in the transferring step, a predetermined bias has been applied to the toner.

The bias to be applied can be reduced as follows: an external additive is added to the toner to produce a shape on the surface of the photosensitive member, to thereby reduce the adhesive property of the toner to the surface of the photosensitive member. Thus, a space for a high-voltage power source for applying a high bias can be saved in the electrophotographic apparatus. Moreover, the scattering of the toner caused by a high transfer bias can be suppressed, and hence an improvement in image quality can be achieved. The following has heretofore been proposed as one method of reducing the adhesive force of the toner to the surface of the photosensitive member through the production of the shape on the surface of the photosensitive member: to bring the toner and the surface of the photosensitive member into point contact with each other, particles are incorporated into the surface of the electrophotographic photosensitive member to form convex shapes thereon.

In Japanese Patent Application Laid-Open No. 2014-178424, there is a description of a technology including incorporating an aggregated metal oxide into a protection layer of a photosensitive member to impart roughness to the surface of the protection layer for suppressing blade abrasion over long-term use and ensuring a cleaning property.

In Japanese Patent Application Laid-Open No. H08-234471, there is a description of a technology including incorporating silicon atom-containing particles having different average particle diameters into a protection layer for improving a cleaning property and for improving abrasion resistance of a photosensitive member.

In Japanese Patent Application Laid-Open No. 2012-108487, there is a description of a technology including localizing particles in the vicinity of the surface of a protection layer for increasing releasability and for increasing abrasion resistance.

In Japanese Patent Application Laid-Open No. 2012-203403, there is a description of a technology including incorporating particles of a charge-transportable material into an outermost surface layer for suppressing the generation of a color-streaked image.

However, an investigation made by the inventors of the present invention has found that in each of the electrophotographic photosensitive members described in Japanese Patent Application Laid-Open No. 2014-178424, Japanese Patent Application Laid-Open No. H08-234471, Japanese Patent Application Laid-Open No. 2012-108487, and Japanese Patent Application Laid-Open No. 2012-203403, the closeness between the particles contained in the surface layer of the electrophotographic photosensitive member may make it difficult to suppress the detachment of the particles from the surface layer while maintaining point contact with toner at the time of transfer by convex portions derived from the particles. In particular, it has been found that the transferability is deteriorated when the adhesive property of the toner to the surface layer in a test of long-term use of the electrophotographic photosensitive member is increased.

SUMMARY OF THE INVENTION

Accordingly, an object of the present invention is to provide an electrophotographic photosensitive member, which has transferability improved by controlling a distance between particles contained in a surface layer to reduce the adhesive force of toner, and which has durability improved by suppressing the detachment of the particles from the surface layer.

The above-mentioned object is achieved by the present invention described below. That is, according to the present invention, there is provided an electrophotographic photosensitive member including a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a scanning probe microscope, satisfy the following formulae (i) and (ii).

$$30 \leq Rmk\max \leq 70 \quad \text{(i)}$$

$$100 \leq L\max \leq 500 \quad \text{(ii)}$$

In addition, according to the present invention, there is provided a process cartridge including: the above-mentioned electrophotographic photosensitive member; and at least one unit selected from the group consisting of a charging unit; a developing unit; and a cleaning unit, the process cartridge integrally supporting the electrophotographic photosensitive member and the at least one unit, and being detachably attachable onto a main body of an electrophotographic apparatus.

In addition, according to the present invention, there is provided an electrophotographic apparatus including: the above-mentioned electrophotographic photosensitive member; and a charging unit, an exposing unit, a developing unit, and a transfer unit.

Further features of the present invention will become apparent from the following description of exemplary embodiments with reference to the attached drawings.

DESCRIPTION OF THE EMBODIMENTS

The present invention is described in detail below by way of preferred embodiments.

[Electrophotographic Photosensitive Member]

An electrophotographic photosensitive member of the present invention is characterized by including a surface layer.

The term "surface layer" as used herein refers to a layer positioned on the outermost surface in the photosensitive member, and means a layer to be brought into contact with a charging member or toner.

Figure 1:
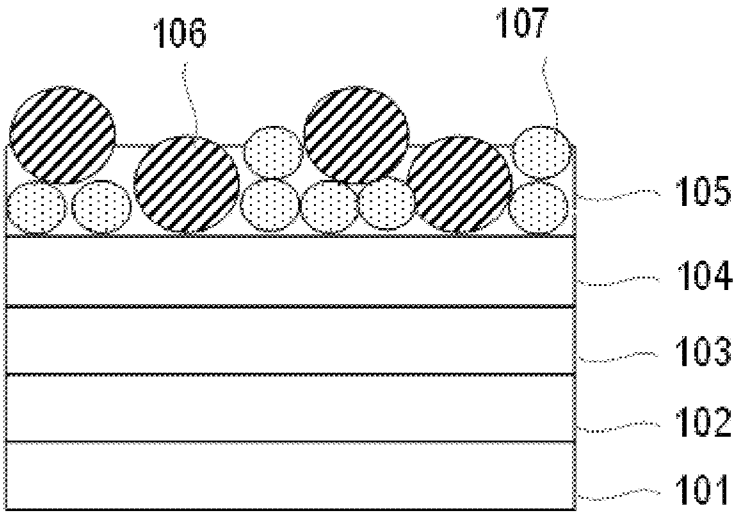
FIG. 1 is an illustration of an example of the layer configuration of an electrophotographic photosensitive member according to the present invention.

FIG. 1 is a view for illustrating an example of the layer configuration of the electrophotographic photosensitive member. In FIG. 1, a support is represented by reference symbol 101, an undercoat layer is represented by reference symbol 102, a charge-generating layer is represented by reference symbol 103, and a charge-transporting layer is represented by reference symbol 104. The surface layer according to the present invention is represented by reference symbol 105, a particle A according to the present invention are each represented by reference symbol 106, and a particle B according to the present invention are each represented by reference symbol 107.

A method of producing the electrophotographic photosensitive member of the present invention is, for example, a method including: preparing coating liquids for respective layers to be described later; applying the coating liquids in a desired order of layers; and drying the coating liquids. In this case, examples of a method of applying the coating liquid include dip coating, spray coating, inkjet coating, roll coating, die coating, blade coating, curtain coating, wire bar coating, ring coating, and dispense coating. Of those, dip coating is preferred from the viewpoints of efficiency and productivity.

The respective layers are described below.

<Surface Layer>

An investigation made by the inventors of the present invention has found that the electrophotographic photosensitive member of the present invention is required to be an electrophotographic photosensitive member including a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a scanning probe microscope, satisfy the following formulae (i) and (ii).

$$30 \leq Rmk\max \leq 70 \quad \text{(i)}$$

$$100 \leq L\max \leq 500 \quad \text{(ii)}$$

The dependency of the averaged sectional difference of elevation (Rmk) on the calculated length (L) is described below. This parameter is calculated by the following steps (1) to (5). After the measurement of the three-dimensional surface profile data: z (x, y) of a target surface layer, the following steps are performed.

Figure 2:
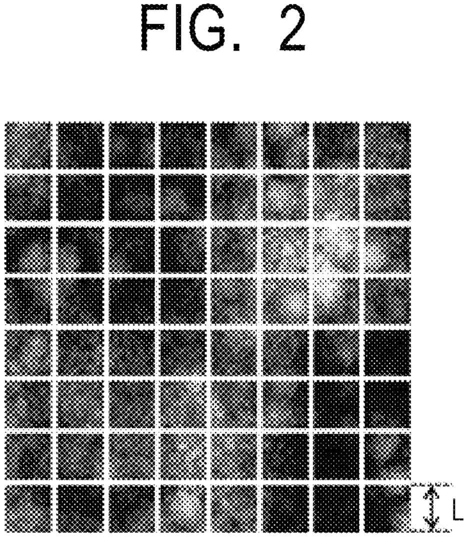
FIG. 2 is an illustration of an example obtained by dividing surface profile data by a calculated length L according to the present invention.

(1) The resultant surface profile data is divided into meshes each having one side length: L (FIG. 2).

Figure 3:
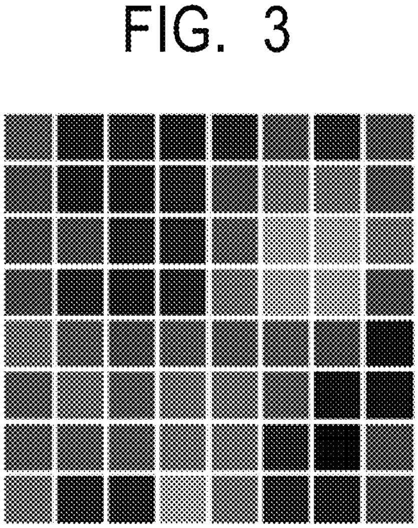
FIG. 3 is a diagram obtained by averaging the heights in FIG. 2 for each calculated length L.

(2) In each mesh having the one side length L, the heights: z (x, y) are averaged (FIG. 3).

Figure 4A:
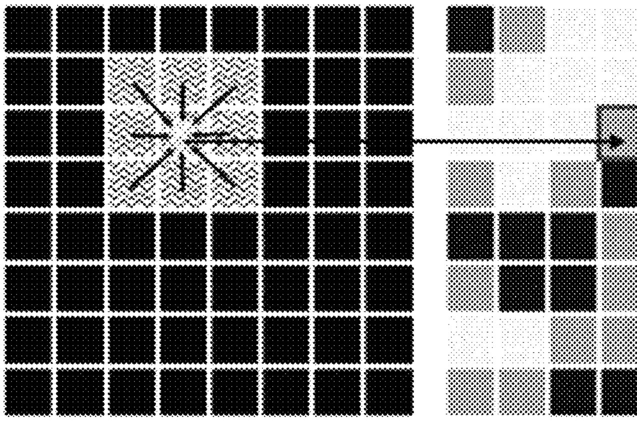
FIG. 4A is a diagram obtained by calculating a sectional difference of elevation for each calculated length L in FIG. 3.
Figure 4B:
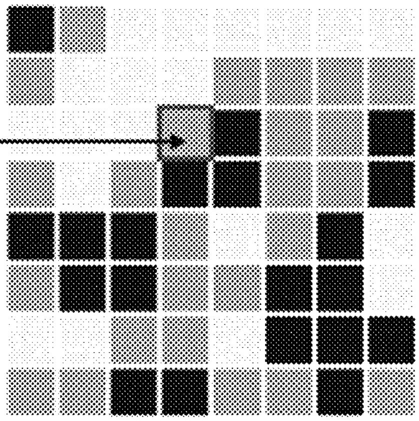
FIG. 4B is a diagram obtained by calculating a sectional difference of elevation for each calculated length L in FIG. 3.

(3) In each mesh, the sectional difference of elevation is calculated from the difference in height from the surrounding meshes (FIG. 4A and FIG. 4B).

Figure 5:
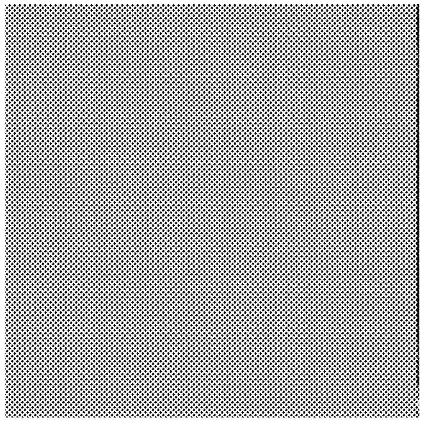
FIG. 5 is a diagram obtained by averaging the sectional differences of elevation in FIG. 4A and FIG. 4B.

(4) The resultant sectional differences of elevation are averaged across all the meshes (FIG. 5). The resultant average is referred to as "averaged sectional difference of elevation: Rmk".

(5) The steps (1) to (4) are repeated by changing the L to provide the dependency of the averaged sectional difference of elevation (Rmk) on the calculated length (L), that is, a function: Rmk (L).

Figure 6:
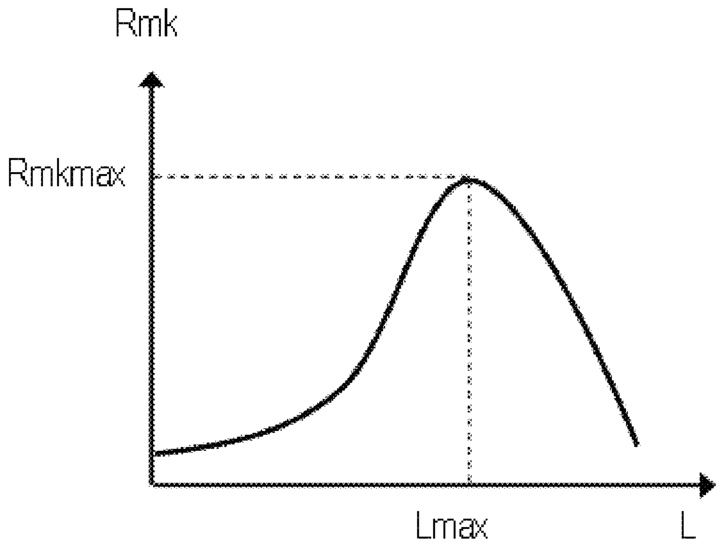
FIG. 6 is an illustration of an example of a graph showing a relationship between the calculated length L and the averaged sectional difference of elevation Rmk.

When the Rmk (L) thus obtained is graphed with the horizontal axis being the logarithm of the calculated length: L (nm) and the vertical axis being the averaged sectional difference of elevation: Rmk (nm), for example, such a graph as shown FIG. 6 is obtained. The maximum value of the Rmk in this graph is represented by Rmkmax, and the L when the Rmkmax is taken is represented by Lmax.

Figure 7:
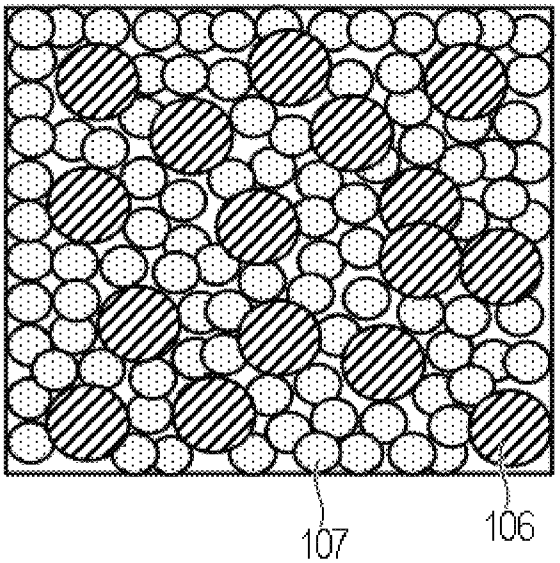
FIG. 7 is a conceptual view obtained by observing a surface layer of the electrophotographic photosensitive member according to the present invention from above (surface observation).
Figure 8:
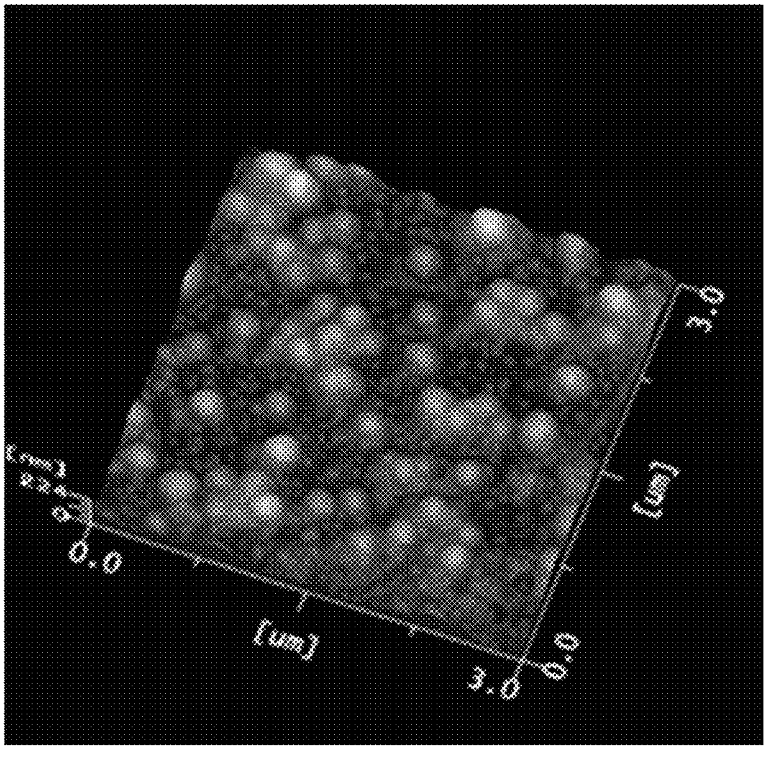
FIG. 8 is a diagram based on an example of a scanning probe microscopic image (photograph) obtained by observing the surface layer of the electrophotographic photosensitive member according to the present invention.

A method of measuring three-dimensional surface profile data in the present invention is described. There is no particular limitation on the measurement of the three-dimensional surface profile data. For example, a commercially available atomic force microscope, electron microscope, laser microscope, optical microscope, and optical interferometric three-dimensional surface profile measuring device may be used. In Examples of the present invention, surface profile measurement was performed through use of a scanning probe microscope (hereafter also referred to as "SPM", JSPM-5200, manufactured by JEOL Ltd.) (see FIG. 8). In the measurement, height information was acquired at a resolution obtained by dividing a 10 μm square of a sample cut out for measurement into 262,144 (512×512) parts through use of an AC/NC mode. The resultant height information was output to a CSV file, and was used as calculable three-dimensional surface profile data z (x, y). FIG. 7 is a conceptual view obtained by observing a surface layer of the electrophotographic photosensitive member from above (surface observation).

Although the reason why the effects of the present invention can be exhibited by the above-mentioned conditions has not been clearly elucidated, the inventors of the present invention have assumed the reason to be as described below.

To improve transferability in an electrophotographic apparatus, the adhesive force of toner with which an electrostatic latent image on its photosensitive member is developed needs to be reduced. The adhesive force between the toner and the electrophotographic photosensitive member is roughly classified into an electrostatic adhesive force and a non-electrostatic adhesive force. The electrostatic adhesive force is mainly caused by an image force, and hence largely depends on the charge quantity of the toner. The magnitude of the image force is proportional to the charge quantity of the toner, and is inversely proportional to the square of a distance between the toner and the surface of the photosensitive member to which the toner is to adhere. Accordingly, as the roughness derived from the particles on the surface of the photosensitive member becomes larger, the distance between the photosensitive member and the toner can be made longer (the adhesiveness between the surface of the photosensitive member and the toner can be suppressed). Accordingly, the image force becomes smaller, and hence the transferability of the toner to a transfer material is improved. An approach to increasing the Rmkmax that is one of the roughness parameters is, for example, an increase in size of each of the particles to be introduced, the push-up of the particles toward the upper portion of the surface layer by an increase in ratio of the particles in the surface layer, or the reflection of the convex shape of each of the particles themselves by the reduction in thickness. An approach to controlling the Lmax is, for example, a change in size of each of the particles to be introduced, the control of dispersibility of the particles in the film, or the control of a distance between large-diameter particles by mixing of small particles with large-diameter particles as spacers.

The value of the ratio of the total volume of the particles occupying the surface layer to the volume of the binder resin occupying the surface layer (hereinafter also referred to as "P (total volume of particles)/B (volume of binder resin)") needs to be 0.50 or more and 3.0 or less. When the P/B is too small, the particles are embedded inside the film when image printing is repeated, and the roughness for improving the transferability may not be sufficiently expressed. Conversely, when the P/B is too large, the binder resin for fixing the particles is not sufficient, and the particles are detached when the use of the photosensitive member is continued, with the result that the original transferability cannot be expressed. The P/B is preferably 1.0 or more and 3.0 or less, more preferably 1.6 or more and 2.5 or less. In addition, here, as illustrated in FIG. 1 and FIG. 2, the particles contained in the surface layer include those which are covered with the binder resin and those which are exposed from the binder resin.

Here, the P/B may be calculated, for example, from the addition amounts, densities, and true specific gravities of the polymerizable monomer having a polymerizable functional group to be used in a coating liquid for a surface layer and the particles. For the specific gravities of a polymerization product obtained after the polymerization of the polymerizable monomer having a polymerizable functional group and the particles, reference can be made to values published in the manufacturers of the respective materials and the database "POLYINFO" of National Institute for Materials Science. For example, in Examples of the present invention, the following values were used as the specific gravities of main materials.

Polymerization product of (meth)acrylic monomer density: 1.2 g/cm$^3$

Silica particle density: 1.8 g/cm$^3$

Titanium oxide density: 4.0 g/cm$^3$

Alternatively, the specific gravities may also be calculated from the existence ratio of the particles and the resin by sectional observation using a focused ion beam processing system (hereinafter also referred to as "FIB-SEM").

Meanwhile, as a method of representing the surface roughness, there are various standards as specified under JIS Standards "JIS B0601 2001" regarding a roughness profile. However, most of those roughness parameters represent "height information on limited convex portions," such as one point or ten points in the surface profile, or "average of all convex portions," such as a height and a distance between the convex portions. Accordingly, the parameters cannot correctly describe the transferability.

For example, the arithmetic average roughness Ra that is one of the most general-purpose roughness parameters represents average height information, and for example, the shape having a large amount of small roughness and the shape having a small amount of large roughness are treated as the same. The distance between the photosensitive member and the toner is important for the transferability. Thus, in those two shapes, the transferability of the former tends to be more effectively expressed, and hence it cannot be said that the above-mentioned parameter can accurately express the effect on the transferability. The 10-point average roughness Rzjis is roughness information calculated based on the five highest points and the five lowest points from the measured height information, and hence what kind of height information is owned by the other portions is not taken into consideration. Thus, even with the same Rzjis, when the density of the convex portions is low, for example, when all the portions other than the 10 points to be targeted are flat, the photosensitive member surface having some convex height can gain a sufficient distance from the toner, but the other flat portions cannot gain a distance from the toner and cannot improve the transferability. Thus, it cannot be said that the Rzjis can accurately express the effect on the transferability. With the Rmk parameter, regarding the surface profile having a low density of convex portions, the information on the density is represented by the height Rmk, and hence a distinction can be made when the Rmkmax is decreased. The maximum height Rz is also similar to the Rzjis. The average length Rsm of a roughness curve element expresses an average interval between the convex portion and the concave portion. Although the average length Rsm represents the interval between the convex portion and the concave portion, the height information is not taken into consideration. Thus, for example, the surface profile having height information of 10 nm and the surface profile having height information of 1,000 nm are treated in the same manner, and hence the transferability cannot be expressed.

In addition, even when those parameters are combined, the transferability cannot be correctly expressed. For example, considering that the surface profile is expressed by the combination of the Ra and the Rsm, at first glance, it appears that both the height information in a z-direction and the interval between the convex portions in an xy-direction can be expressed. However, in this case, it cannot be said that the distribution of the convex portions is accurately expressed, and the relationship between the surface profile in which large convex portions are uniformly dispersed and the transferability, and the relationship between the surface profile in which large convex portions are densely distributed and the transferability cannot be distinguished from each other. In the latter case, there are areas without the convex portions, resulting in unevenness in the transferability, and hence it cannot be said that the effect on the transferability can be accurately expressed. With the Rmk parameter according to the present invention, in the latter shape, the Lmax is shifted to a larger value than that in the former shape, and hence both the shapes can be distinguished from each other.

As described above, the Rmk parameter can be expressed as a distribution in which the height information of the convex portions is tied to the existence state thereof, which are not found in the conventional roughness parameters, and the Rmkmax and the Lmax can be said to be roughness parameters suitable for controlling the transferability of the photosensitive member. When the Rmkmax is too small, the distance between the photosensitive member and the toner cannot be sufficiently gained. As a result, the adhesive force cannot be decreased, and the transferability cannot be improved. When the Rmkmax is too large, the adhesive force between the convex portions and the toner is increased to the extent that the increase cannot be ignored, with the result that the transferability is decreased. The Rmkmax is preferably 30 nm or more and 70 nm or less, more preferably 30 nm or more and 60 nm or less. When the Lmax is too small, the surface layer is filled with the convex portions, resulting in an increase in number of contact points between the toner parent particles and the surface layer. Thus, the interval between the convex portions is too narrow with respect to the curvatures of the toner particles, resulting in an increase in number of contact points. The increase increases the image force and deteriorates the transferability. In addition, when the Lmax is too large, the particles are aggregated to be divided into sparse portions and dense portions, causing portions with poor transferability and portions with satisfactory transferability in one photosensitive member. As a result, when a halftone image is output, density unevenness occurs in the image. The Lmax is preferably 100 nm or more and 500 nm or less, more preferably 100 nm or more and 400 nm or less.

Examples of the particles to be used in the present invention include: organic resin particles such as acrylic resin particles; and inorganic particles such as silica. Of those, inorganic particles are preferred.

The acrylic particles each contain a polymer of an acrylic acid ester or a methacrylic acid ester. Of those, styrene acrylic particles are more preferred. There is no particular limitation on the polymerization degree of an acrylic resin or a styrene acrylic resin, or on whether the resin is thermoplastic or thermosetting. Examples of the organic resin particles include crosslinked polystyrene, a crosslinked acrylic resin, a phenol resin, a melamine resin, polyethylene, polypropylene, acrylic particles, polytetrafluoroethylene particles, and silicone particles.

Examples of the inorganic particles include silica particles, metal oxide particles, and metal particles. Inorganic particles, which have low elasticity, and are advantageous in terms of the promotion of point contact between the toner and the photosensitive member, are preferably used as the particles in the surface layer of the electrophotographic photosensitive member of the present invention.

When the inorganic particles are used, silica particles out of the particles are preferred. The silica particles are expected to exhibit the following effect because the particles have a lower elastic modulus and a larger average circularity than those of the other insulating particles: the particles promote the point contact between the toner and the photosensitive member to alleviate the adhesive force of the toner.

Known silica fine particles may be used as the silica particles, and fine particles of dry silica and fine particles of wet silica may each be used. Of those, fine particles of wet silica obtained by a sol-gel method (hereinafter also referred to as "sol-gel silica") are preferred.

The sol-gel silica to be used as the particles in the surface layer of the electrophotographic photosensitive member of the present invention may be hydrophilic, or its surface may be subjected to hydrophobic treatment.

A method for the hydrophobic treatment is, for example, a method including removing a solvent from a silica sol suspension in the sol-gel method to dry the suspension, and then treating the dried product with a hydrophobic treatment agent, or a method including directly adding the hydrophobic treatment agent to the silica sol suspension to dry and treat the suspension simultaneously. Of those, a method including directly adding the hydrophobic treatment agent to the silica sol suspension is preferred from the viewpoints of the control of the half-width of the particle size distribution of the sol-gel silica and the control of the saturated moisture adsorption amount thereof.

Examples of the hydrophobic treatment agent include the following:

chlorosilanes, such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes, such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane;

silazanes, such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils, such as a dimethyl silicone oil, a methyl hydrogen silicone oil, a methyl phenyl silicone oil, an alkyl-modified silicone oil, a chloroalkyl-modified silicone oil, a chlorophenyl-modified silicone oil, a fatty acid-modified silicone oil, a polyether-modified silicone oil, an alkoxy-modified silicone oil, a carbinol-modified silicone oil, an amino-modified silicone oil, a fluorine-modified silicone oil, and an end reactive silicone oil;

siloxanes, such as hexamethylcyclotrisiloxane, octamethylcyclotetrasiloxane, decamethylcyclopentasiloxane, hexamethyldisiloxane, and octamethyltrisiloxane; and as fatty acids and metal salts thereof, long-chain fatty acids, such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidonic acid, and salts of those fatty acids and metals, such as zinc, iron, magnesium, aluminum, calcium, sodium, and lithium.

Of those, alkoxysilanes, silazanes, and silicone oils are each preferably used because the hydrophobic treatment is easily performed. Those hydrophobic treatment agents may be used alone or in combination thereof.

The number-based average primary particle diameter (hereinafter also referred to as "average primary particle diameter") of the particles to be introduced is preferably 50 nm or more and 500 nm or less. Of those, the average primary particle diameter is more preferably 350 nm or less.

When the particle diameter is less than 50 nm, the height of each of the convex portions derived from the particles contained in the surface layer of the electrophotographic photosensitive member, the height contributing to point contact of the convex portions with the toner, cannot be ensured. Accordingly, the adhesive property of the toner cannot be suppressed, and hence the transferability is decreased. Meanwhile, when the particle diameter is more than 350 nm, the adhesive force between the toner and the surface of the electrophotographic photosensitive member caused by the convex portions is increased, and hence the transferability is deteriorated. When the particle diameter is more than 500 nm, the transferability is further deteriorated. The number-based average primary particle diameter of the particles is more preferably 80 nm or more and 350 nm or less.

It is preferred that the surface layer of the present invention contain two or more kinds of particles having different sizes. When the particles having different sizes are incorporated, small particles can effectively impart roughness by playing a role as spacers that appropriately keep the distance between large particles. When the surface layer contains particles X and particles Y having different number-based average primary particle diameters, the number-based average primary particle diameter of the particles X is represented by DX [nm], and the number-based average primary particle diameter of the particles Y is represented by DY [nm], it is preferred that the DX and the DY satisfy the following relationship formulae (v) and (vi).

$$1.2 \leq DX/DY \leq 4.0 \quad \text{(vi)}$$

$$80 \leq DX \leq 350 \quad \text{(vii)}$$

When the surface layer of the present invention contains, as the above-mentioned particles, an inorganic particle A and an inorganic particle B having different number-based average primary particle diameters, the number-based average primary particle diameter of the inorganic particle A is represented by DA [nm], and the number-based average primary particle diameter of the inorganic particle B is represented by DB [nm], it is preferred that the DA and the DB satisfy the following relationship formulae (iii) and (iv).

$$1.2 \leq DA/DB \leq 4.0 \quad \text{(iii)}$$

$$80 \leq DA \leq 350 \quad \text{(iv)}$$

When the DA/DB is more than 4.0, the inorganic particle B are too small to play a role as spacers that keep the distance between the inorganic particle A. When the DA/DB is less than 1.2, the average particle diameter of the inorganic particle B is too close to the average primary particle diameter of the inorganic particle A, and also in this case, the inorganic particle B cannot play a role as spacers.

A case in which the average primary particle diameter DA is less than 80 nm is not preferred because the height of each of the convex portions derived from the particles contained in the surface layer of the electrophotographic photosensitive member, the height contributing to point contact between the toner and the convex portions, is decreased, and the number of contact points is increased to deteriorate the adhesive property of the toner, with the result that the transferability is liable to be decreased. Meanwhile, a case in which the average primary particle diameter DA is more than 350 nm is not preferred because of the following reason: the curvatures of the convex portions derived from the particles are increased to increase an area of the adhesion portions between the toner and the surface layer to the extent that the adhesive force caused by the convex portions cannot be ignored; and thus the adhesive force between the toner and the surface of the electrophotographic photosensitive member is increased, with the result that the transferability is liable to be deteriorated.

It is more preferred that the DA satisfy the following formula (v).

$$90 \leq DA \leq 250 \quad \text{(v)}$$

The number-based average primary particle diameters DA and DB may be measured by sectional observation using, for example, the FIB-SEM (e.g., NVision 40 manufactured by SII/Zeiss or Strata 400S manufactured by FEI). A sample piece is cut out of a produced photosensitive member, and particles and a resin are distinguished from each other by the difference in contrast in observation results of the Slice & View and the composition analysis using the SEM-EDX function. The diameters of the particles are measured from the observed image, and an average value thereof is defined as the number-based average primary particle diameter. A particle size distribution A with the particle diameter of each of the particles contained in the surface of the surface layer being the horizontal axis and the number-based frequency in each particle diameter being the vertical axis is created. When there are a plurality of peaks, a peak having the highest frequency at the peak top is defined as a first peak, and a peak having the second highest frequency at the peak top after the first peak is defined as a second peak. The first peak and the second peak are compared to each other, and the peak having the larger value of a particle diameter at the peak top is defined as a peak PEA, and the peak having the smaller value of a particle diameter at the peak top is defined as a peak PEB. Then, the particle diameter at the peak top of the peak PEA in the above-mentioned particle size distribution A is represented by DA, and the particle diameter at the peak top of the peak PEB is represented by DB.

The surface layer in the present invention may contain an additive, such as an antioxidant, a UV absorber, a plasticizer, a leveling agent, a slipperiness-imparting agent, or an abrasion resistance-improving agent. Specific examples thereof include a hindered phenol compound, a hindered amine compound, a sulfur compound, a phosphorus compound, a benzophenone compound, a siloxane-modified resin, and a silicone oil.

The surface layer of the present invention may be formed by: preparing a coating liquid for a surface layer containing the above-mentioned respective materials and a solvent; forming a coat of the coating liquid; and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The binder resin according to the present invention comes in the following forms.

Examples of the binder resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred. In addition, the surface layer of the present invention may be formed as a cured film by polymerizing a composition containing a monomer having a polymerizable functional group. A reaction in this case is, for example, a thermal polymerization reaction, a photopolymerization reaction, or a radiation polymerization reaction. Examples of the polymerizable functional group of the monomer having a polymerizable functional group include an acryloyl group and a methacryloyl group.

Examples of the following compound having one functional group are represented by formulae (2-1) to (2-6).

(2-1)

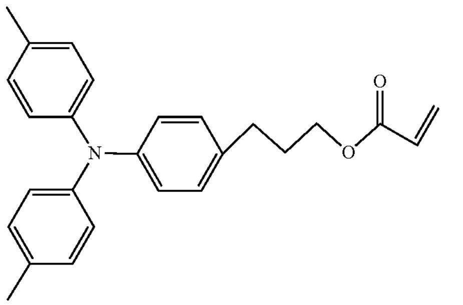

-continued (2-2)

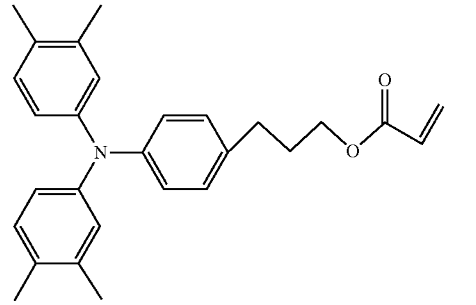

(2-3)

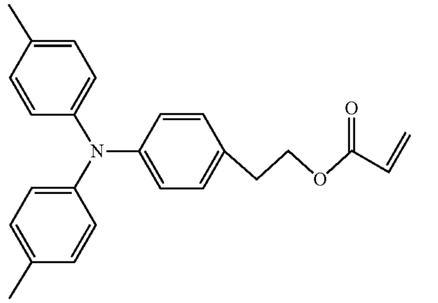

(2-4)

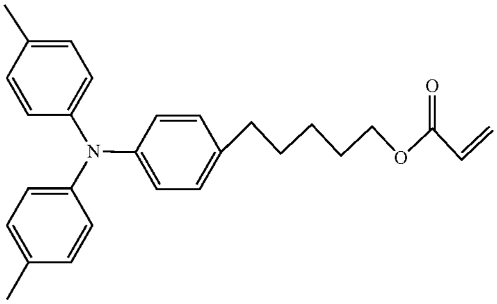

(2-5)

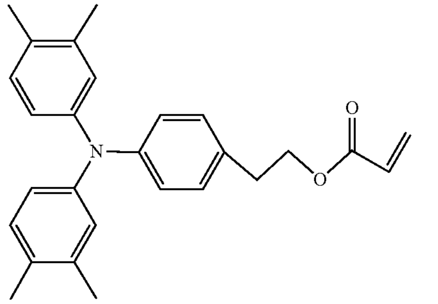

(2-6)

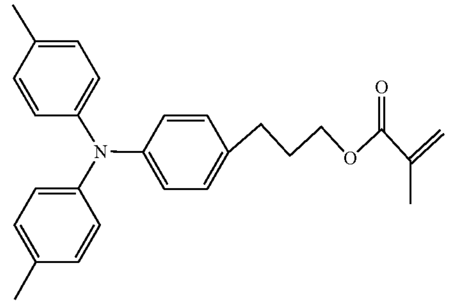

Examples of the following compound having a plurality of functional groups are represented by formulae (3-1) to (3-6).

(3-1)

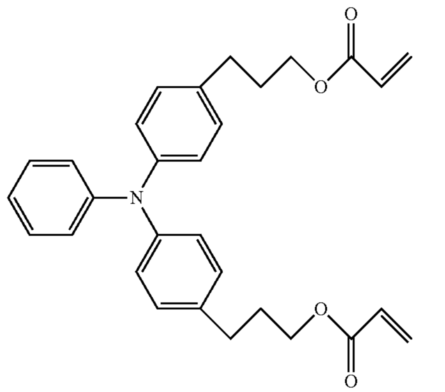

(3-2)

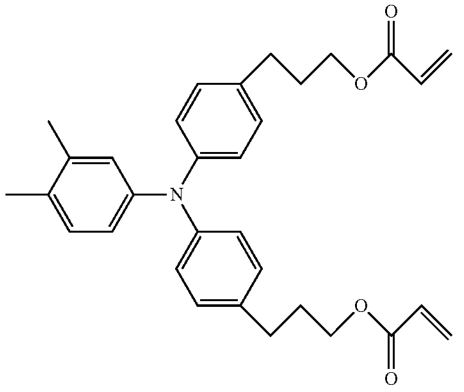

(3-3)

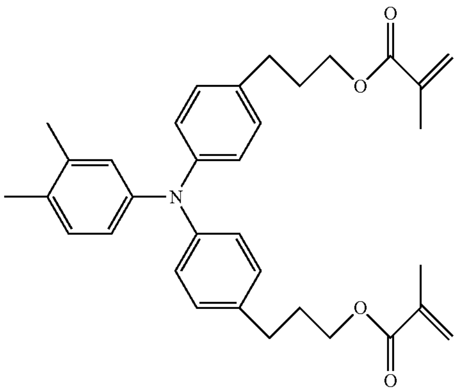

(3-4)

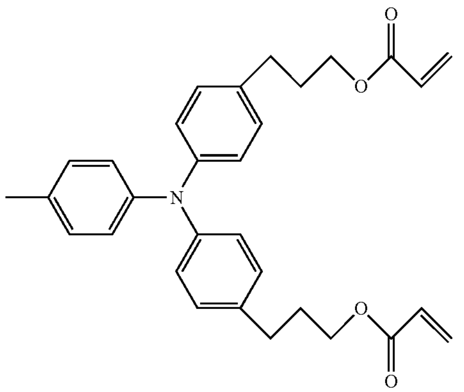

-continued (3-5)

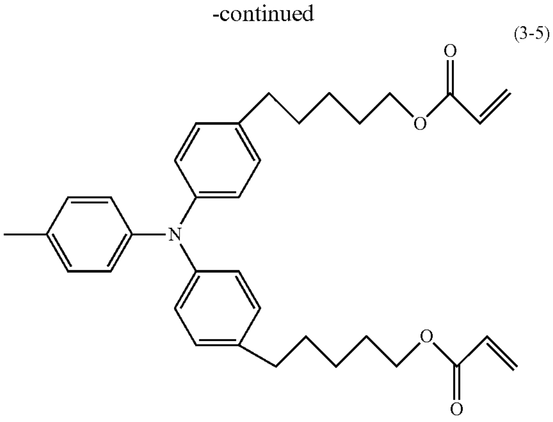

(3-6)

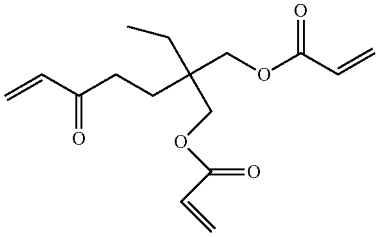

It is preferred that the binder resin of the surface layer be a polymerization product of a composition containing a polymerizable monomer having a polymerizable functional group that provides a surface layer having excellent rubbing resistance and high hardness. It is more preferred that the polymerizable monomer having a polymerizable functional group be a (meth)acrylic monomer. From the viewpoint of enhancing a surrounding effect on inorganic particles, it is preferred that a polyfunctional (meth)acrylic monomer that easily forms a three-dimensional structure be used as a monomer forming a (meth)acrylic polymer.

Specific examples of the polyfunctional acrylate include the following: pentaerythritol tri(meth)acrylate, pentaerythritol tetra(meth)acrylate, trimethylolpropane tri(meth)acrylate, ethylene oxide (EO) modified trimethylolpropane tri (meth)acrylate, propylene oxide (PO) modified trimethylolpropane tri(meth)acrylate, dipentaerythritol penta and hexa(meth)acrylate, and isocyanuric acid EO modified di- and tri(meth)acrylate. Of those, dipentaerythritol penta(meth)acrylate and dipentaerythritol hexa(meth) acrylate may be particularly suitably used.

In particular, in order to obtain excellent rubbing resistance and low tackiness compared to the surface layer of the related-art electrophotographic photosensitive member, it is required that a (meth)acrylic polymer using a (meth)acrylic monomer, which is a polymerizable monomer having 6 or more polymerizable functional groups (hereinafter also referred to as "polymerizable monomer A"), be used as the binder resin.

In order to reduce the elasticity that contributes to tackiness, the molecular weight of the (meth)acrylic monomer having 6 or more polymerizable functional groups needs to be set to 540 or more and 1,300 or less. Specific examples of the (meth)acrylic monomer having 6 or more polymerizable functional groups include the following: polypentaerythritol polyacrylate (structural formula (1-1), n=1 to 2) and urethane acrylate (structural formula (1-2)).

(1-1)

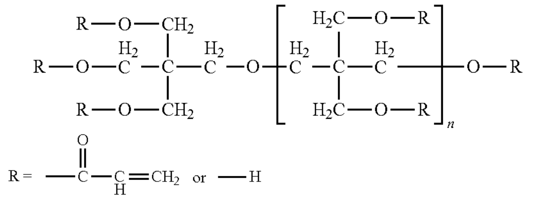

(1-2)

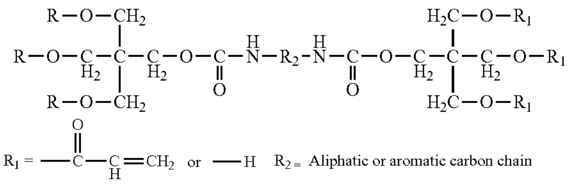

In order to suppress shrinkage at the time of the curing of a film of a curable composition and to adjust the viscosity to a suitable level for applying the curable composition, two or more kinds of monomers selected from the above-mentioned monomer group may be appropriately mixed and used.

Specific examples of a solvent that stably disperses or dissolves the above-mentioned monomer component may include the following:

alcohols, such as methanol, ethanol, isopropanol, butanol, and octanol;

ketones, such as acetone and cyclohexanone;

esters, such as ethyl acetate, butyl acetate, ethyl lactate, γ-butyrolactone, propylene glycol monomethyl ether acetate, and propylene glycol monoethyl ether acetate;

ethers, such as ethylene glycol monomethyl ether and diethylene glycol monobutyl ether;

aromatic hydrocarbons, such as benzene, toluene, and xylene; and amides, such as dimethylformamide, dimethylacetamide, and N-methylpyrrolidone.

Of those, methyl isobutyl ketone, methyl ethyl ketone, cyclohexanone, propylene glycol monomethyl ether acetate, propylene glycol monoethyl ether acetate, toluene, xylene, 2-butanone, or 4-methyl-2-pentanone may be suitably used. This is because each of those solvents can dissolve an acrylic polymer more uniformly and is quickly volatilized from the film of the curable composition.

In addition, a plurality of solvents may be used in combination in order to adjust the drying speed of the film of the curable composition and to adjust the viscosity of the curable composition to a suitable level for application.

The thickness of the surface layer is preferably 0.5 μm or more and 2.0 μm or less. When the thickness is less than 0.5 μm, the number of particles that are exposed is increased, and the detachment of the particles is liable to occur at the time of continuous use. When the thickness is 2.0 μm or more, the particles are embedded inside the film, and the appropriate roughness is not easily achieved.

<Support>

In the present invention, the electrophotographic photosensitive member preferably includes a support. In the present invention, the support is preferably an electroconductive support having electroconductivity. In addition, examples of the shape of the support include a cylindrical shape, a belt shape, and a sheet shape. A support having a cylindrical shape out of those shapes is preferred. In addition, the surface of the support may be subjected to, for example, electrochemical treatment such as anodization, blast treatment, or cutting treatment.

A metal, a resin, glass, or the like is preferred as a material for the support. Examples of the metal include aluminum, iron, nickel, copper, gold, stainless steel, and alloys thereof. An aluminum support using aluminum out of those metals is preferred.

In addition, electroconductivity may be imparted to the resin or the glass through treatment including, for example, mixing or covering the resin or the glass with an electroconductive material.

<Electroconductive Layer>

In the present invention, an electroconductive layer may be arranged on the support. The arrangement of the electroconductive layer can conceal flaws and unevenness in the surface of the support, and control the reflection of light on the surface of the support. The electroconductive layer preferably contains electroconductive a particle and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may have a laminated configuration in which particles before being covered, such as titanium oxide, barium sulfate, or zinc oxide, are covered with a metal oxide having composition different from that of the particles before being covered. An example of the covering is a metal oxide such as tin oxide.

In addition, when the metal oxide is used as the electroconductive particles, their average primary particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a silicone oil, resin particles, or a concealing agent such as titanium oxide.

The electroconductive layer has an average thickness of preferably 1 μm or more and 50 μm or less, particularly preferably 3 μm or more and 40 μm or less.

The electroconductive layer may be formed by: preparing a coating liquid for an electroconductive layer containing the above-mentioned respective materials and a solvent; forming a coat of the coating liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method including using a paint shaker, a sand mill, a ball mill, or a liquid collision-type high-speed disperser.

<Undercoat Layer>

In the present invention, an undercoat layer may be arranged on the support or the electroconductive layer.

The undercoat layer has an average thickness of preferably 0.1 μm or more and 50 μm or less, more preferably 0.2 μm or more and 40 μm or less, particularly preferably 0.3 μm or more and 30 μm or less.

A resin for the undercoat layer is, for example, a polyacrylic acid resin, a polyvinyl alcohol resin, a polyvinyl acetal resin, a polyethylene oxide resin, a polypropylene oxide resin, an ethyl cellulose resin, a methyl cellulose resin, a polyamide resin, a polyamic acid resin, a polyurethane resin, a polyimide resin, a polyamideimide resin, a polyvinylphenol resin, a melamine resin, a phenol resin, an epoxy resin, and an alkyd resin.

In addition, a resin having a structure in which a resin having a polymerizable functional group and a monomer having a polymerizable functional group are crosslinked with each other is permitted.

In addition, the undercoat layer may contain an inorganic compound or an organic compound in addition to the resin.

Examples of the inorganic compound include a metal, an oxide, and a salt.

Examples of the metal include gold, silver, and aluminum. Examples of the oxide include zinc oxide, white lead, aluminum oxide, indium oxide, silicon oxide, zirconium oxide, tin oxide, titanium oxide, magnesium oxide, antimony oxide, and bismuth oxide. Examples of the salt include barium sulfate and strontium titanate.

Those inorganic compounds may each be present under a particle state in a film serving as the undercoat layer.

The number-based average primary particle diameter of the particles of the inorganic compound is preferably 1 nm or more and 500 nm or less, more preferably 3 nm or more and 400 nm or less.

Those inorganic compounds may each have a laminated configuration including a core particle and a covering layer covering the particle.

The surfaces of those inorganic compounds may each be treated with, for example, a silicone oil, a silane compound, a silane coupling agent, or any other organosilicon compound, or an organotitanium compound. In addition, those inorganic compounds may each be doped with an element, such as tin, phosphorus, aluminum, or niobium.

Examples of the organic compound include an electron-transporting compound and an electroconductive polymer.

Examples of the electroconductive polymer include polythiophene, polyaniline, polyacetylene, polyphenylene, and polyethylenedioxythiophene.

Examples of the electron-transporting compound include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound.

The electron-transporting compound may have a polymerizable functional group and may be crosslinked with a resin having a functional group reactive with the functional group. Examples of the polymerizable functional group include a hydroxy group, a thiol group, an amino group, a carboxyl group, a vinyl group, an acryloyl group, a methacryloyl group, and an epoxy group.

Those organic compounds may each be present under a particle state in the film, or their surfaces may be treated.

Various additives including a leveling agent such as a silicone oil, a plasticizer, and a thickener may be added to the undercoat layer.

The undercoat layer is obtained by: preparing a coating liquid for an undercoat layer containing the above-mentioned materials; then applying the coating liquid onto the support or the electroconductive layer; and then drying or curing the coat.

A solvent at the time of the production of the coating liquid is, for example, an alcohol-based solvent, a ketone-based solvent, an ether-based solvent, an ester-based solvent, or an aromatic hydrocarbon-based solvent.

A dispersion method for dispersing the particles of the materials in the coating liquid is, for example, a method including using a paint shaker, a sand mill, a ball mill, or a liquid collision-type high-speed disperser.

<Photosensitive Layer>

The photosensitive layers of the electrophotographic photosensitive member are mainly classified into (1) a laminate-type photosensitive layer and (2) a monolayer-type photosensitive layer. (1) The laminate-type photosensitive layer is a photosensitive layer having a charge-generating layer containing a charge-generating material and a charge-transporting layer containing a charge-transporting material. (2) The monolayer-type photosensitive layer is a photosensitive layer containing both of a charge-generating material and a charge-transporting material.

(1) Laminate-Type Photosensitive Layer

The laminate-type photosensitive layer has the charge-generating layer and the charge-transporting layer.

(1-1) Charge-Generating Layer

The charge-generating layer preferably contains the charge-generating material and a resin.

Examples of the charge-generating material include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating material in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by: preparing a coating liquid for a charge-generating layer containing the above-mentioned respective materials and a solvent; forming a coat of the coating liquid on the undercoat layer; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The charge-generating layer has a thickness of preferably 0.1 μm or more and 1.5 μm or less, more preferably 0.15 μm or more and 1.0 μm or less.

(1-2) Charge-Transporting Layer

The charge-transporting layer preferably contains the charge-transporting material and a resin.

Examples of the charge-transporting material include a polycyclic aromatic compound, a heterocyclic compound, a hydrazone compound, a styryl compound, an enamine compound, a benzidine compound, a triarylamine compound, and a resin having a group derived from each of those materials. Of those, a triarylamine compound and a benzidine compound are preferred.

The content of the charge-transporting material in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting material and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluororesin particles, polystyrene resin particles, polyethylene resin particles, silica particles, alumina particles, and boron nitride particles.

The charge-transporting layer may be formed by: preparing a coating liquid for a charge-transporting layer containing the above-mentioned respective materials and a solvent; forming a coat of the coating liquid on the charge-generating layer; and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The charge-transporting layer has a thickness of 3 μm or more and 50 μm or less, more preferably 5 μm or more and 40 μm or less, particularly preferably 10 μm or more and 30 μm or less.

(2) Monolayer-Type Photosensitive Layer

The monolayer-type photosensitive layer may be formed by: preparing a coating liquid for a photosensitive layer containing the charge-generating material, the charge-transporting material, a resin, and a solvent; forming a coat of the coating liquid on the undercoat layer; and drying the coat. Examples of the charge-generating material, the charge-transporting material, and the resin are the same as those of the materials in the section "(1) Laminate-type Photosensitive Layer."

The monolayer-type photosensitive layer has a thickness of preferably 10 μm or more and 45 μm or less, more preferably 25 μm or more and 35 μm or less.

[Process Cartridge and Electrophotographic Apparatus]

The above-mentioned electrophotographic photosensitive member can be included in a process cartridge, which integrally supports at least one unit selected from the group consisting of: a charging unit; a developing unit; and a cleaning unit. The process cartridge is characterized by being detachably attachable onto the main body of an electrophotographic apparatus.

Figure 9:
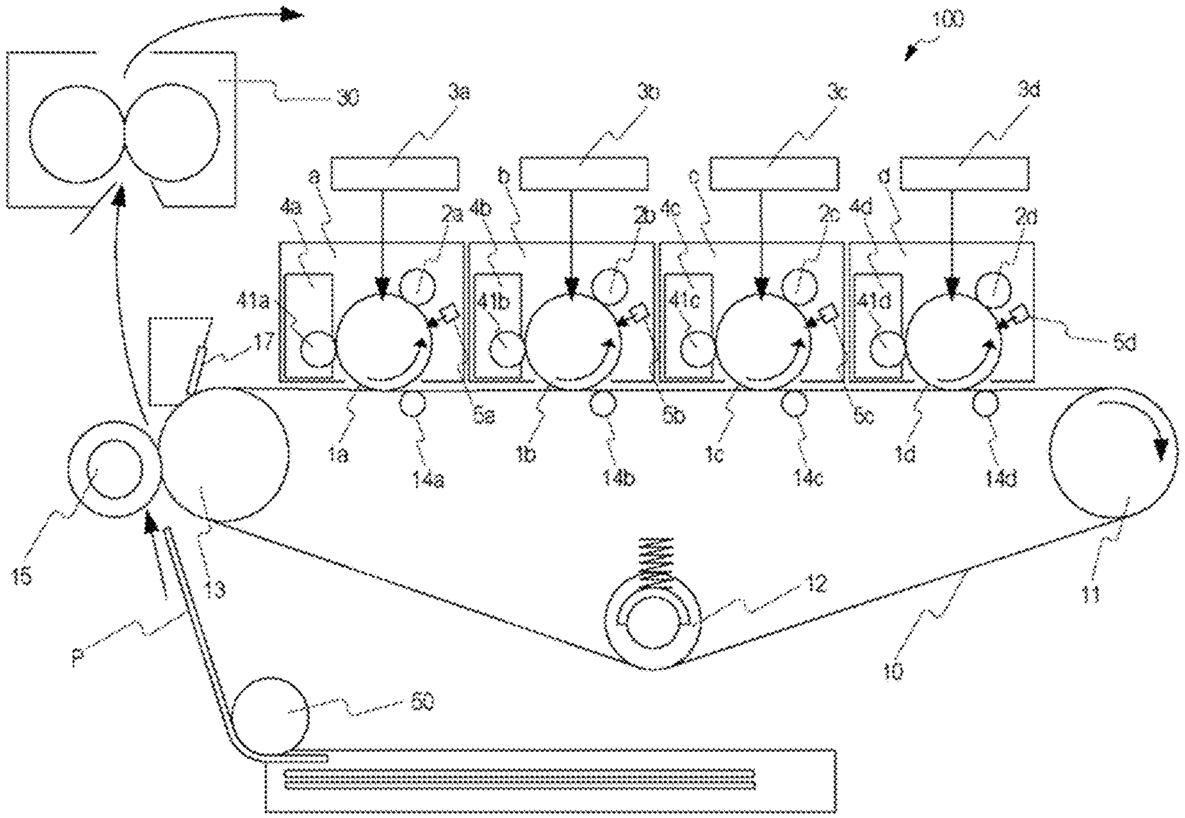
FIG. 9 is a view for illustrating an example of the schematic configuration of an electrophotographic apparatus including a process cartridge including an electrophotographic photosensitive member and a charging unit.

An example of the schematic configuration of an electrophotographic apparatus including a process cartridge including the electrophotographic photosensitive member of the present invention is illustrated in FIG. 9.

[Configuration of Electrophotographic Apparatus]

An electrophotographic apparatus of the present invention may include: the above-mentioned electrophotographic photosensitive member; and a charging unit, an exposing unit, a developing unit, and a transfer unit.

An electrophotographic apparatus of this embodiment is a so-called tandem-type electrophotographic apparatus including a plurality of image forming portions "a" to "d". A first image forming portion "a" forms an image with a toner of yellow (Y). A second image forming portion "b" forms an image with a toner of magenta (M). A third image forming portion "c" forms an image with a toner of cyan (C). A fourth image forming portion "d" forms an image with a toner of black (Bk). Those four image forming portions are arranged in a row at constant intervals, and the configurations of the respective image forming portions are substantially the same in many respects except the color of a toner to be stored. Thus, the electrophotographic apparatus of this embodiment is described below through use of the first image forming portion "a".

The first image forming portion "a" includes a photosensitive drum 1*a* that is a drum-shaped electrophotographic photosensitive member, a charging roller 2*a* that is a charging member, a developing unit 4*a*, and an electricity-removing unit 5*a*.

The photosensitive drum 1*a* is an image-bearing member that bears a toner image, and is rotationally driven in a direction indicated by the arrow illustrated in the figure at a predetermined peripheral speed (process speed). The developing unit 4*a* stores a yellow toner and develops the yellow toner on the photosensitive drum 1*a* with a developing roller 41*a*.

An image forming operation is started when a control unit (not shown) such as a controller receives an image signal, and the photosensitive drum 1*a* is rotationally driven. During the rotation process, the photosensitive drum 1*a* is uniformly charged to a predetermined voltage (charging voltage) with a predetermined polarity (negative polarity in this embodiment) by the charging roller 2*a*, and is exposed to light by an exposing unit 3*a* in accordance with the image signal. Thus, an electrostatic latent image corresponding to a yellow color component image of a target color image is formed on the photosensitive drum 1*a*. Then, the electrostatic latent image is developed by the developing unit 4*a* at a developing position and visualized as a yellow toner image on the photosensitive drum 1*a*. Here, the normal charging polarity of the toner stored in the developing unit 4*a* is a negative polarity, and the electrostatic latent image is subjected to reversal development with the toner charged to the same polarity as the charging polarity of the photosensitive drum 1*a* by the charging roller 2*a*. However, the present invention is not limited thereto, and the present invention may be applied even to an electrophotographic apparatus in which an electrostatic latent image is subjected to normal development with a toner charged to a polarity opposite to the charging polarity of the photosensitive drum 1*a*. In addition, many convex portions derived from particles may be arranged on the surface layer of the charging roller 2*a*. The convex portions arranged on the surface layer of the charging roller 2*a* each have a role as a spacer between the charging roller 2*a* and the photosensitive drum 1*a* in a charging portion. The role is as follows: when transfer residual toner, which is toner remaining on the photosensitive drum 1*a* without being transferred in a primary transfer portion to be described later, enters the charging portion, the contamination of the charging roller 2*a* with the transfer residual toner due to the contact of sites except the convex portions with the transfer residual toner is suppressed.

A pre-exposing unit 5*a* serving as an electricity-removing unit exposes the surface of the photosensitive drum 1*a* before the charging of the surface of the photosensitive drum 1*a* by the charging roller 2*a* to light to remove electricity therefrom. The unit removes the electricity from the surface of the photosensitive drum 1*a* to play a role of leveling a surface potential formed on the photosensitive drum 1*a* and a role of controlling the quantity of electricity discharged by discharge occurring in the charging portion.

An endless and movable intermediate transfer belt 10 has electroconductivity, is brought into contact with the photosensitive drum 1*a* to form a primary transfer portion, and is rotated at substantially the same peripheral speed as that of the photosensitive drum 1*a*. In addition, the intermediate transfer belt 10 is tensioned by a counter roller 13 serving as a counter member, a drive roller 11 and a tension roller 12 each serving as a tension member, and a metal roller 14*a*, and is tensioned by the tension roller 12 under a tension of a total pressure of 60 N. The intermediate transfer belt 10 can be moved when the drive roller 11 is rotationally driven in a direction indicated by the arrow illustrated in the figure.

The yellow toner image formed on the photosensitive drum 1*a* is primarily transferred from the photosensitive drum 1*a* to the intermediate transfer belt 10 in the process of passing through the primary transfer portion N1*a*.

The second, third, and fourth image forming portions in FIG. 9 include photosensitive drums 1*b*, 1*c*, and 1*d*, charging rollers 2*b*, 2*c*, and 2*d*, exposing units 3*b*, 3*c*, and 3*d*, developing units 4*b*, 4*c*, and 4*d*, electricity-removing units 5*b*, 5*c*, and 5*d*, metal rollers 14*b*, 14*c*, and 14*d*, and developing rollers 41*b*, 41*c*, and 41*d*, respectively.

Subsequently, a magenta toner image of the second color, a cyan toner image of the third color, and a black toner image of the fourth color are formed in the same manner, and are sequentially transferred onto the intermediate transfer belt 10 so as to be superimposed on one another. Thus, toner images of four colors corresponding to the target color image are formed on the intermediate transfer belt 10. After that, the toner images of the four colors borne on the intermediate transfer belt 10 are secondarily transferred in a batch onto the surface of a transfer material P, such as paper or an OHP sheet, fed by a sheet feeding unit 50 in the process of passing through a secondary transfer portion formed by the contact between a secondary transfer roller 15 and the intermediate transfer belt 10. The transfer material P having the toner images of the four colors transferred thereto by the secondary transfer is then heated and pressurized in a fixing unit 30, and the toners of the four colors are melted and mixed to be fixed onto the transfer material P. The toner remaining on the intermediate transfer belt 10 after the secondary transfer is cleaned and removed by a belt-cleaning unit 17 arranged so as to face the counter roller 13 through intermediation of the intermediate transfer belt 10.

The electrophotographic photosensitive member of the present invention may be used in, for example, a laser beam printer, an LED printer, or a copying machine.

EXAMPLES

The present invention is further specifically described below with reference to Examples and Comparative Examples. The present invention is by no means limited by the following Examples without departing from the gist of the present invention. In the following description of Examples, the term "part(s)" is by mass unless otherwise specified.

<Production of Electrophotographic Photosensitive Member>

A support, an electroconductive layer, an undercoat layer, a charge-generating layer, a charge-transporting layer, and a surface layer were produced by the following methods.

<Preparation of Coating Liquid 1 for Electroconductive Layer>

Anatase-type titanium oxide having a number-based average primary particle diameter of 200 nm was used as a substrate, and a sulfuric acid solution of titanium and niobium containing 33.7 parts of titanium in terms of $TiO_2$ and 2.9 parts of niobium in terms of $Nb_2O_5$ was prepared. 100 Parts of the substrate was dispersed in pure water to provide 1,000 parts of a suspension, and the suspension was warmed to 60° C. The sulfuric acid solution of titanium and niobium, and 10 mol/L sodium hydroxide were dropped over 3 hours so that the pH of the suspension became from 2 to 3. After the dropping of the total amounts of the solutions, the pH was adjusted to the vicinity of a neutral value, and a polyacrylamide-based aggregating agent was added to precipitate a solid content. The supernatant was removed, and the residue was filtered and washed, followed by drying at 110° C. Thus, an intermediate containing 0.1 wt % of organic matter derived from the aggregating agent in terms of C was obtained. The intermediate was fired in nitrogen at 700° C. for 1 hour, and was then fired in air at 500° C. to produce titanium oxide particles. The number-based average primary particle diameter of the resultant particles was 210 nm.

Subsequently, 50 parts of a phenol resin (monomer/oligomer of a phenol resin) (product name: PLYOPHEN J-325, manufactured by DIC Corporation, resin solid content: 60%, density after curing: 1.3 g/cm$^2$) serving as a binding material was dissolved in 35 parts of 1-methoxy-2-propanol serving as a solvent to provide a solution.

60 Parts of the titanium oxide particles produced above were added to the solution, and the mixture was loaded into a vertical sand mill using 120 parts of glass beads having a number-average primary particle diameter of 1.0 mm as a dispersion medium, and was subjected to dispersion treatment for 4 hours under the conditions of a dispersion liquid temperature of 23° C.±3° C. and a number of revolutions of 1,500 rpm (peripheral speed: 5.5 m/s). Thus, a dispersion liquid was obtained. The glass beads were removed from the dispersion liquid with a mesh. 0.01 Parts of a silicone oil (product name: SH28 PAINT ADDITIVE, manufactured by Dow Corning Toray Co., Ltd.) serving as a leveling agent and 8 parts of silicone resin particles (product name: KMP-590, manufactured by Shin-Etsu Chemical Co., Ltd., average primary particle diameter: 2 μm, density: 1.3 g/cm$^3$) serving as a surface roughness-imparting material were added to the dispersion liquid after the removal of the glass beads, and the mixture was stirred, followed by filtration with PTFE filter paper (product name: PF-060, manufactured by Advantec Toyo Kaisha, Ltd.) under pressure. Thus, a coating liquid 1 for an electroconductive layer was prepared.

<Preparation of Coating Liquid 1 for Undercoat Layer>

100 Parts of rutile-type titanium oxide particles (average primary particle diameter: 50 nm, manufactured by Tayca Corporation) were stirred and mixed with 500 parts of toluene, and 3.5 parts of vinyltrimethoxysilane (product name: KBM-1003, manufactured by Shin-Etsu Chemical Co., Ltd.) was added to the mixture, followed by dispersion treatment in a vertical sand mill using glass beads each having a diameter of 1.0 mm for 8 hours. After the glass beads had been removed, toluene was evaporated by distillation under reduced pressure, and the residue was dried for 3 hours at 120° C. to provide rutile-type titanium oxide particles whose surfaces had already been treated with an organosilicon compound. When the volume of the resultant titanium oxide particles was represented by "a", and the average primary particle diameter of the titanium oxide particles was represented by "b" [μm], the ratio "a/b" was 15.6. The value of the "a" was determined from a microscopic image obtained by observing a cross-section of an electrophotographic photosensitive member with a field emission scanning electron microscope (FE-SEM, product name: S-4800, manufactured by Hitachi High-Technologies Corporation) after the production of the electrophotographic photosensitive member.

18.0 Parts of the rutile-type titanium oxide particles whose surfaces had already been treated with the organosilicon compound, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid.

The dispersion liquid was subjected to dispersion treatment in a vertical sand mill using glass beads each having a diameter of 1.0 mm for 5 hours, and the glass beads were removed. Thus, a coating liquid 1 for an undercoat layer was prepared.

<Synthesis of Phthalocyanine Pigment>

Synthesis Example 1

Under a nitrogen flow atmosphere, 100 g of gallium trichloride and 291 g of orthophthalonitrile were added to 1,000 mL of α-chloronaphthalene, and the mixture was subjected to a reaction at a temperature of 200° C. for 24 hours, followed by the filtration of the product. The resultant wet cake was stirred in N,N-dimethylformamide under heating at a temperature of 150° C. for 30 minutes, and was then filtered. The resultant filter residue was washed with methanol, and was then dried to provide a chlorogallium phthalocyanine pigment in a yield of 83%.

20 Grams of the chlorogallium phthalocyanine pigment obtained by the above-mentioned method was dissolved in 500 mL of concentrated sulfuric acid, and the solution was stirred for 2 hours. After that, the solution was dropped into a mixed solution of 1,700 mL of distilled water and 660 mL of concentrated ammonia water, which had been cooled with ice, so that the pigment was reprecipitated. The precipitate was sufficiently washed with distilled water, and was dried to provide a hydroxygallium phthalocyanine pigment.

<Preparation of Coating Liquid 1 for Charge-Generating Layer>

0.5 Parts of the hydroxygallium phthalocyanine pigment obtained in Synthesis Example 1, 7.5 parts of N,N-dimethylformamide (product code: D0722, manufactured by Tokyo Chemical Industry Co., Ltd.), and 29 parts of glass beads each having a diameter of 0.9 mm were subjected to milling treatment with a sand mill (BSG-20, manufactured by AIMEX Co., Ltd.) under a temperature of 25° C. for 24 hours. At this time, the treatment was performed under such a condition that the disc of the sand mill rotated 1,500 times in 1 minute. The liquid thus treated was filtered with a filter (product number: N-NO. 125T, pore diameter: 133 μm, manufactured by NBC Meshtec Inc.) so that the glass beads were removed. 30 Parts of N,N-dimethylformamide was added to the liquid, and then the mixture was filtered, followed by sufficient washing of the filter residue on a filter with n-butyl acetate. Then, the washed filter residue was dried in a vacuum to provide 0.45 parts of a hydroxygallium phthalocyanine pigment. The resultant pigment contained N,N-dimethylformamide.

Subsequently, 20 parts of the hydroxygallium phthalocyanine pigment obtained by the milling treatment, 10 parts of polyvinyl butyral (product name: S-LEC BX-1, manufactured by Sekisui Chemical Co., Ltd.), 190 parts of cyclohexanone, and 482 parts of glass beads each having a diameter of 0.9 mm were subjected to dispersion treatment with a sand mill (K-800, manufactured by Igarashi Machine Production Co., Ltd. (currently AIMEX Co., Ltd.), disc diameter: 70 mm, number of discs: 5) under a cooling water temperature of 18° C. for 4 hours. At this time, the treatment was performed under such a condition that the discs each rotated 1,800 times in 1 minute. The glass beads were removed from the dispersion liquid, and 444 parts of cyclohexanone and 634 parts of ethyl acetate were added to the residue to prepare a coating liquid 1 for a charge-generating layer.

<Preparation of Coating Liquid 1 for Charge-Transporting Layer>

Next, the following materials were prepared to produce a mixed solvent.

Orthoxylene 25 parts by mass

Methyl benzoate 25 parts by mass

Dimethoxymethane 25 parts by mass

Further, the following materials were dissolved in the mixed solvent to prepare a coating liquid 1 for a charge-transporting layer.

Charge-transporting substance (hole-transportable substance) represented by the following structural formula (CTM-1) 5 parts by mass Charge-transporting substance (hole-transportable substance) represented by the following structural formula (CTM-2) 5 parts by mass Polycarbonate (product name: Iupilon Z400, manufactured by Mitsubishi Engineering-Plastics Corporation) 10 parts by mass (CTM-1)

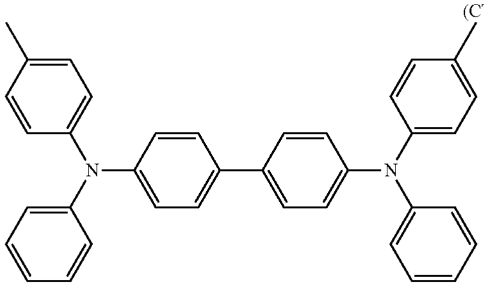

-continued (CTM-2)

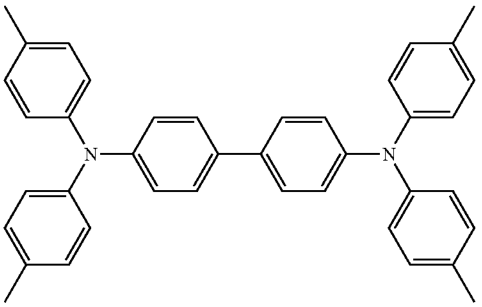

Production Example 1 of Surface Layer Containing Particles

As shown in Table 1, particles 1 to 11 for surface layers were prepared.

TABLE 1

| Particle No. for surface layer | Product name | Manufacturer | Average primary particle diameter [nm] |
|---|---|---|---|
| 1 | QSG-170 | Shin-Etsu Chemical Co., Ltd. | 170 |
| 2 | QSG-80 | Shin-Etsu Chemical Co., Ltd. | 80 |
| 3 | QSG-30 | Shin-Etsu Chemical Co., Ltd. | 30 |
| 4 | QSG-100 | Shin-Etsu Chemical Co., Ltd. | 100 |
| 5 | QSG-10 | Shin-Etsu Chemical Co., Ltd. | 10 |
| 6 | QSG-90 | Shin-Etsu Chemical Co., Ltd. | 90 |
| 7 | KE-P30 | Nippon Shokubai Co., Ltd. | 300 |
| 8 | KE-P50 | Nippon Shokubai Co., Ltd. | 500 |
| 9 | MT-600SA | Tayca Corporation | 50 |
| 10 | EPOSTAR Type SS | Nippon Shokubai Co., Ltd. | 100 |
| 11 | PT-501R | Ishihara Sangyo Kaisha, Ltd. | 180 |

<Preparation of Coating Liquid 1 for Surface Layer>

Particle 1 for a surface layer ("QSG-170", manufactured by Shin-Etsu Chemical Co., Ltd.) 2.5 parts by mass Particle 2 for a surface layer ("QSG-80", manufactured by Shin-Etsu Chemical Co., Ltd.) 2.5 parts by mass Monomer represented by the following structural formula (0-2) 1.50 parts by mass Siloxane-modified acrylic compound (product name: SYMAC US270, manufactured by Toagosei Co., Ltd.) 0.1 parts by mass 1-Propanol 100.0 parts by mass Cyclohexane 100.0 parts by mass The above-mentioned components were mixed, and were stirred with a stirring device for 6 hours to prepare a coating liquid 1 for a surface layer.

(O-2)

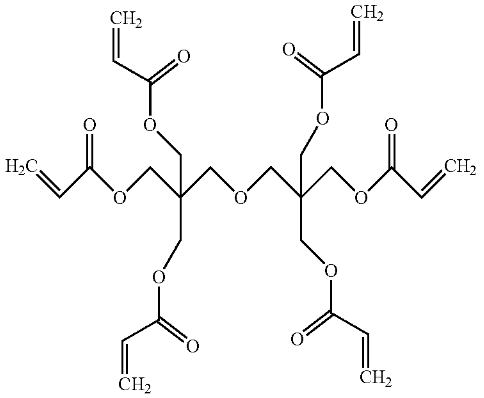

<Preparation of Coating Liquids 2 to 28 for Surface Layers>

Coating liquids 2 to 28 for surface layers were each prepared in the same manner as in the preparation of the coating liquid 1 for a surface layer except that the kinds and addition amounts of the particles (particle A and particle B) for a surface layer, and the kinds and addition amounts of the polymerizable monomers (monomer M1 and monomer M2) for forming the binder resin were changed as shown in Table 2.

TABLE 2

| Coating | Particle A | | Particle B | | Monomer M1 | | Monomer M2 | |
|---|---|---|---|---|---|---|---|---|
| liquid No. for surface layer | Particle No. for surface layer | Part(s) by mass [—] | Particle No. for surface layer | Part(s) by mass [—] | Structural formula | Part(s) by mass [—] | Structural formula | Part(s) by mass [—] |
| 1 | 1 | 2.5 | 2 | 2.5 | O-2 | 1.50 | — | — |
| 2 | 1 | 3.9 | 2 | 1.1 | O-2 | 1.50 | — | — |
| 3 | 1 | 3.5 | 2 | 1.5 | O-2 | 1.50 | — | — |
| 4 | 1 | 2.0 | 2 | 3.0 | O-2 | 1.50 | — | — |
| 5 | 1 | 0.8 | 2 | 4.2 | O-2 | 1.50 | — | — |
| 6 | 1 | 1.5 | 2 | 3.5 | O-2 | 1.50 | — | — |
| 7 | 1 | 5.0 | 2 | 5.0 | O-2 | 3.00 | — | — |
| 8 | 1 | 5.0 | 2 | 5.0 | O-2 | 4.00 | — | — |
| 9 | 1 | 5.0 | 2 | 5.0 | O-2 | 5.00 | — | — |
| 10 | 1 | 5.0 | 2 | 5.0 | O-2 | 3.00 | — | — |
| 11 | 1 | 5.0 | 2 | 5.0 | O-2 | 3.00 | — | — |
| 12 | 7 | 1.5 | 1 | 1.5 | O-2 | 3.00 | — | — |
| 13 | 8 | 1.5 | 5 | 1.5 | O-2 | 3.00 | — | — |
| 14 | 2 | 3.0 | 5 | 3.0 | O-2 | 3.00 | — | — |
| 15 | 9 | 7.0 | 5 | 3.0 | O-2 | 3.00 | — | — |
| 16 | 1 | 2.2 | 2 | 2.2 | O-2 | 3.00 | — | — |
| 17 | 1 | 1.2 | 2 | 1.2 | O-2 | 3.00 | — | — |
| 18 | 1 | 1.2 | 2 | 1.2 | O-2 | 1.00 | — | — |
| 19 | 1 | 1.2 | 2 | 1.2 | O-2 | 0.55 | — | — |
| 20 | 1 | 1.2 | 2 | 1.2 | O-2 | 0.65 | — | — |

TABLE 2-continued

| Coating | Particle A | | Particle B | | Monomer M1 | | Monomer M2 | |
|---|---|---|---|---|---|---|---|---|
| liquid No. for surface layer | Particle No. for surface layer | Part(s) by mass [—] | Particle No. for surface layer | Part(s) by mass [—] | Structural formula | Part(s) by mass [—] | Structural formula | Part(s) by mass [—] |
| 21 | 8 | 1.0 | 5 | 2.0 | O-2 | 3.00 | — | — |
| 22 | 1 | 5.0 | 9 | 5.0 | O-2 | 3.00 | — | — |
| 23 | 1 | 5.0 | 3 | 5.0 | O-2 | 3.00 | — | — |
| 24 | 1 | 5.0 | 5 | 5.0 | O-2 | 3.00 | — | — |
| 25 | 4 | 3.0 | 2 | 3.0 | O-2 | 1.50 | — | — |
| 26 | 4 | 3.0 | 6 | 3.0 | O-2 | 1.50 | — | — |
| 27 | 10 | 2.5 | 2 | 3.0 | O-2 | 1.50 | — | — |
| 28 | 11 | 5.8 | 2 | 2.5 | O-2 | 1.50 | — | — |
| 29 | 1 | 2.5 | 2 | 2.5 | 3-3 | 1.50 | — | — |
| 30 | 1 | 2.5 | 2 | 2.5 | 3-3 | 0.75 | 2-6 | 0.75 |
| 31 | 1 | 4.2 | 9 | 0.8 | O-2 | 1.50 | — | — |
| 32 | 1 | 4 | 9 | 4.0 | O-2 | 1.50 | — | — |
| 33 | 8 | 2.5 | 9 | 2.5 | O-2 | 1.50 | — | — |
| 34 | 7 | 2.5 | 9 | 2.5 | O-2 | 1.50 | — | — |
| 35 | 4 | 10 | 9 | 5.0 | O-2 | 3.00 | — | — |
| 36 | 1 | 0.5 | 9 | 0.5 | O-2 | 1.50 | — | — |
| 37 | 1 | 1.2 | 9 | 1.2 | O-2 | 0.45 | — | — |

<Production Example of Electrophotographic Photosensitive Member 1>

<Support>

An aluminum cylinder having a diameter of 24 mm and a length of 257 mm was used as a support (cylindrical support).

<Electroconductive Layer>

The coating liquid 1 for an electroconductive layer was applied onto the above-mentioned support by dip coating to form a coat, and the coat was heated at 140° C. for 30 minutes to be cured. Thus, an electroconductive layer having a thickness of 18 μm was formed.

<Undercoat Layer>

The coating liquid 1 for an undercoat layer was applied onto the above-mentioned electroconductive layer by dip coating to form a coat, and the coat was heated at 100° C. for 10 minutes to be cured. Thus, an undercoat layer having a thickness of 2.1 μm was formed.

<Charge-Generating Layer>

The coating liquid 1 for a charge-generating layer was applied onto the above-mentioned undercoat layer by dip coating to form a coat, and the coat was dried by heating at a temperature of 100° C. for 10 minutes. Thus, a charge-generating layer having a thickness of 0.20 μm was formed.

<Charge-Transporting Layer>

The coating liquid 1 for a charge-transporting layer was applied onto the above-mentioned charge-generating layer by dip coating to form a coat, and the coat was dried by heating at a temperature of 120° C. for 30 minutes. Thus, a charge-transporting layer having a thickness of 18 μm was formed.

<Surface Layer>

The coating liquid 1 for a surface layer was applied onto the above-mentioned charge-transporting layer by dip coating to form a coat, and the coat was warmed at a temperature of 50° C. for 5 minutes. After that, under a nitrogen atmosphere, the coat was irradiated with electron beams for 2.0 seconds under the conditions of an acceleration voltage of 65 kV and abeam current of 5.0 mA while the support (irradiation target) was rotated at a speed of 300 rpm. The dose of the electron beams was 15 kGy. After that, under the nitrogen atmosphere, the temperature of the coat was increased to 120° C. The oxygen concentration of the atmosphere during a time period from the electron beam irradiation to the subsequent heating treatment was 5 ppm.

Next, in the air, the coat was naturally cooled until its temperature became 25° C., and then heating treatment was performed for 30 minutes under such a condition that the temperature of the coat became 110° C. Thus, a surface layer was formed, and an electrophotographic photosensitive member 1 was obtained.

<Production Examples of Electrophotographic Photosensitive Members 2 to 37>

Electrophotographic photosensitive members 2 to 37 were each produced in the same manner as in the production of the electrophotographic photosensitive member 1 except that in the production of the electrophotographic photosensitive member 1, the coating liquid 1 for a surface layer was changed as represented by a condition shown in Tables 3-1 and 3-2.

<Production Example of Electrophotographic Photosensitive Member 38>

An electrophotographic photosensitive member 38 was produced in the same manner as in the electrophotographic photosensitive member 1 except that in the production of the electrophotographic photosensitive member 1, the application of a surface layer was changed as described below.

A coating liquid 38 for a surface protection layer having the following composition was prepared by: milling alumina fine particles, a fine particle dispersant, and part of tetrahydrofuran in advance with a ball mill disperser for 4 hours to produce a fine particle dispersion liquid with a solid content of 10%; and mixing the fine particle dispersion liquid with a hexafunctional radically polymerizable compound, the remaining tetrahydrofuran, and a photopolymerization initiator.

Hexafunctional radically polymerizable compound . . . 100 parts (viscosity at 25° C.: 5,500 mPa-s, KAYARAD DPHA, manufactured by Nippon Kayaku Co., Ltd.)

Alumina (aluminum oxide) fine particle (average primary particle diameter: 31 nm, manufactured by C.I. Kasei Co., Ltd.) . . . 200 parts Fine particle dispersant (DISPERBYK (trademark)-220S, manufactured by BYK Japan KK.) . . . 30 parts Photopolymerization initiator (1-hydroxy-cyclohexyl-phenyl-ketone) . . . 5 parts (Irgacure (trademark) 184, manufactured by BASF Japan Ltd.)

Tetrahydrofuran . . . 2,100 parts

The resultant coating liquid 38 for a surface protection layer was applied by spray coating twice onto the charge transporting layer by a spray coating method while moving a spray device in a longitudinal direction of the charge transporting layer. Thus, a surface layer having an average thickness of 3.5 μm was formed. After the formation of the surface layer, the produced photosensitive member was left to stand for 5 minutes while being rotated.

The surface layer was crosslinked by irradiation with light under the conditions of an illuminance of 500 $mW/cm^2$ and an irradiation time of 20 seconds with a metal halide lamp while the photosensitive member having the surface layer formed thereon was rotated, followed by drying under the conditions of 130° C. for 30 minutes. Thus, an electrophotographic photosensitive member 38 was obtained.

Production Example of Electrophotographic Photosensitive Member 39

An electrophotographic photosensitive member 39 was produced in the same manner as in the electrophotographic photosensitive member 1 except that the production of the surface layer was changed as described below in the production of the electrophotographic photosensitive member 1.

3.3 Parts of CTM represented by the following structural formula (O-3) and 5 parts of a polycarbonate resin (TS-2050, manufactured by Mitsubishi Gas Chemical Company, Inc.) were dissolved in 100 parts of dichloromethane, and 4.5 parts of silica particles (average particle diameter: 0.5 μm) and 4.5 parts of silica particles (average particle diameter: 2 μm) were dispersed in the solution with an ultrasonic disperser. The dispersion liquid thus obtained was applied with a circular amount regulating coater and dried at 90° C. for 1 hour to form a surface layer having a thickness of 2.5 μm. Thus, an electrophotographic photosensitive member 39 was produced.

(O-3)

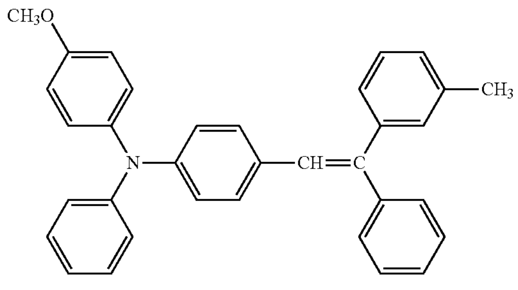

Production Example of Electrophotographic Photosensitive Member 40

An electrophotographic photosensitive member 40 was produced in the same manner as in the electrophotographic photosensitive member 1 except that the production of the surface layer was changed as described below in the production of the electrophotographic photosensitive member 1.

A coating liquid 40 for a surface protective layer was prepared by mixing the following materials.

Trimethylolpropane triacrylate (KAYARAD TMPTA, manufactured by Nippon Kayaku Co., Ltd.) 10 parts (molecular weight: 296, number of functional groups: trifunctional, molecular weight/number of functional groups=99)

Radically polymerizable compound represented by the following structural formula (CTM-3) 10 parts 1-Hydroxy-cyclohexyl-phenyl-ketone (Irgacure 184, manufactured by Ciba Specialty Chemicals) 1 part Tetrahydrofuran 119 parts (CTM-3)

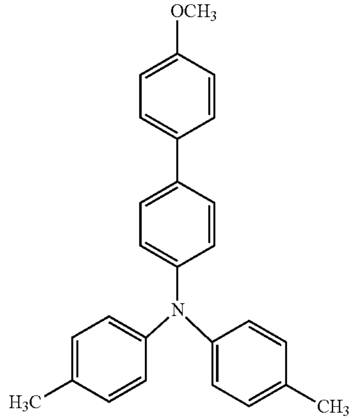

Subsequently, the prepared coating liquid 40 for a surface protection layer was applied onto the charge transporting layer by dip coating, and then silicone resin fine particles (average particle diameter: 0.5 μm, TOSPEARL 105, manufactured by Momentive Performance Materials) were applied to the resultant with a spray gun (MP-200C) manufactured by OLYMPOS under the conditions of a pressure of 4 $kgf/cm^2$, and a distance between a discharge port and a photosensitive member of 10 cm.

After that, the irradiation with light was performed with a UV lamp (bulb type: H bulb) (manufactured by Fusion UV Systems, Inc.) under the conditions of a lamp output of 200 W/cm, an illuminance of 450 $mW/cm^2$, and an irradiation time of 30 seconds to cure the coat.

After that, the resultant was dried at 130° C. for 20 minutes to form a surface layer having a thickness of 3.0 μm. Thus, an electrophotographic photosensitive member 40 was produced.

Production Example of Electrophotographic Photosensitive Member 41

An electrophotographic photosensitive member 41 was produced in the same manner as in the electrophotographic photosensitive member 1 except that the production of the surface layer was changed as described below in the production of the electrophotographic photosensitive member 1.

As the surface layer, 60 parts by mass of a charge transporting material represented by the following structural formula (CTM-4), 30 parts by mass of a charge transporting material represented by the following structural formula (CTM-5), and 10 parts by mass of melamine represented by the following structural formula (O-3) were dissolved in a mixed solution containing 50 parts by mass of t-BuOH and 150 parts by mass of CPME, and then the mixture was left to stand under an environment at 22° C. for 72 hours to prepare a coating liquid 41 for a surface layer.

After that, the resultant coating solution 41 for a surface layer was applied onto the above-mentioned charge transporting layer by dip coating and dried at 150° C. for 40 minutes to form a surface layer having a thickness of 4 μm.

(CTM-4)

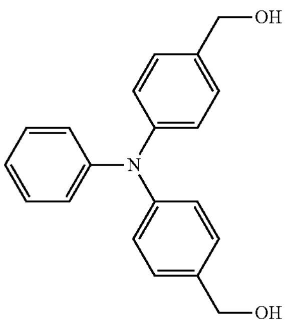

(CTM-5)

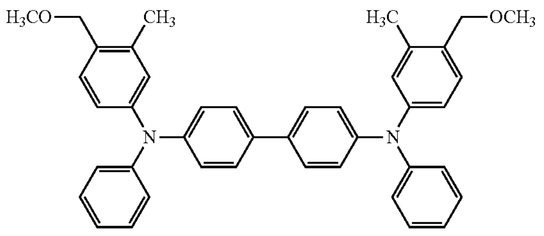

(O-3)

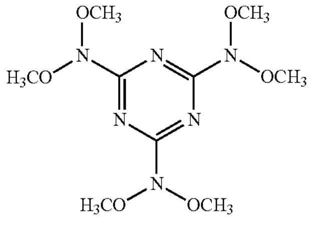

<Evaluation>

<Measurement of Physical Properties of Electrophotographic Photosensitive Member>

Each of the electrophotographic photosensitive members obtained as described above was evaluated for characteristics by the following methods.

<Calculation of P/B in Surface Layer, and Thickness of Surface Layer, of Electrophotographic Photosensitive Member>

Sections of each of the electrophotographic photosensitive members produced in Examples were observed. Samples subjected to the sectional observation were collected from positions determined as follows: positions corresponding to ¼, ½, and ¾ of the length of the electrophotographic photosensitive member from an end portion thereof when the electrophotographic photosensitive member was divided into 4 equal sections in its longitudinal direction were selected, and were shifted from each other by 1200 in the peripheral direction thereof 5-Millimeter square sample pieces were cut out of each of the photosensitive members, and their surface layers were each reconstructed into a three-dimensional object measuring 2 μm by 2 μm by 2 μm with the Slice & View function of a FIB-SEM.

Conditions for the Slice & View function were set as described below.

Processing of sample for analysis: FIB method

Processing and observation device: NVision 40 manufactured by SII/Zeiss

Slice interval: 10 nm (Observation Conditions)

Acceleration voltage: 1.0 kV

Sample tilt: 54°

WD: 5 mm

Detector: BSE detector

Aperture: 60 μm, high current

ABC: ON

Image resolution: 1.25 nm/pixel

In addition, a measurement environment has a temperature of 23° C. and a pressure of $1\times10^{-4}$ Pa. Strata 400S manufactured by FEI (sample tilt: 52°) may also be used as the processing and observation device.

The analysis was performed in a region measuring 2 μm long by 2 μm wide, and pieces of information on the respective sections were integrated to calculate a volume of the particles for a surface layer per unit volume measuring 2 μm long by 2 μm wide by 2 μm thick (8 $\mu m^3$) in the surface of the surface layer and the volume of the binder resin. The images of the respective sections were analyzed with image processing software "Image-Pro Plus" manufactured by Media Cybernetics, Inc.

Based on the information obtained from the image analysis, in each of the four sample pieces, a value P/B of a ratio of the volume of the particles for a surface layer to the volume of the binder resin in the surface layer was calculated from the difference in contrast of the Slice & View of the FIB-SEM. The composition of the particles was determined through use of the SEM-EDX function. In addition, in a cross-section of the electrophotographic photosensitive member of the present invention of FIG. 1, the length from the interface between the charge transporting layer and the surface layer to the exposed surface of the binder resin in the surface layer was adopted as the thickness of the surface layer, and the average value of the respective samples was adopted as the thickness of the surface layer. The results are shown in Tables 3-1 and 3-2.

<Method of Measuring Number-based Average Primary Particle Diameter, DA, and DB of Particles>

Following the <Calculation of P/B in Surface layer of Electrophotographic Photosensitive Member>, it is recognized whether or not a plurality of peaks are present in a particle size distribution A with the particle diameter of each of the particles contained in the surface of the surface layer being the horizontal axis and the number-based frequency in each particle diameter being the vertical axis.

In the particle size distribution A, of the peaks each having a peak top at 20 nm or more among the plurality of peaks, the peak having the highest frequency at the peak top is defined as a first peak. Next, in the particle size distribution, of the peaks each having a peak top at 20 nm or more among the plurality of peaks, the peak having the second highest frequency at the peak top after the first peak is defined as a second peak. Further, the first peak and the second peak are compared to each other, and the peak having the larger value of a particle diameter at the peak top is defined as a peak PEA. Then, the particle diameter at the peak top of the peak PEA in the above-mentioned particle size distribution A is represented by DA.

Next, in the particle size distribution, the peak having the highest frequency at the peak top is defined as a first peak, and the peak having the second highest frequency at the peak top after the first peak is defined as a second peak. The first peak and the second peak are compared to each other, and the peak having the smaller value of a particle diameter at the peak top is defined as a peak PEB. A particle diameter DB at the peak top of the peak PEB is calculated.

<Method of Measuring Rmkmax and Lmax>

A total of three sample pieces each measuring 5 mm by 5 mm were cut out of the resultant electrophotographic photosensitive member in a central portion in a longitudinal direction thereof at intervals of 120° in a peripheral direction thereof. As the SPM, a scanning probe microscope "JSPM-5200" (manufactured by JEOL Ltd.), a scanning probe microscope "E-sweep" (manufactured by Hitachi High-Tech Corporation), a medium-sized probe microscope system AFM5500M (manufactured by Hitachi High-Tech Corporation), or the like may be used.

As the specific measurement method, the respective observation conditions of the "JSPM-5200" and the "E-sweep" are described below. In the present invention, those samples were subjected to surface profile measurement with a scanning probe microscope (JSPM-5200, manufactured by JEOL Ltd.). In the measurement, height information was acquired at a resolution obtained by dividing a 10 μm square of a sample cut out for measurement into 262,144 (512×512) parts through use of an AC/NC mode. The resultant height information was output to a CSV file, and was used as calculable three-dimensional surface profile data z (x, y).

The resultant z (x, y) was analyzed by the above-mentioned method, and the analysis results for the three samples of each electrophotographic photosensitive member were averaged to calculate Rmkmax and Lmax. The results are shown in Tables 3-1 and 3-2.

Observation Conditions of "JSPM-5200"

Scanner: 4

SPM Scan: All SPM Mode

Cantilever: SI-DF3P2 (manufactured by Hitachi High-Tech Fielding Corporation)

Resonance Frequency Detection:

(START) 1.00 kHz (Stop) 100 kHz (in the case of f=67 kHz, depending on the kind of the cantilever)

Cantilever Autotune: Normal approach

Acquisition: 2 Inputs (512)

Scan Mode: Normal

STM/AFM: AC-AFM

Clock: 833.33 s

Scan Size: 3,000 nm

Offset: 0

Bias [V]: 0

Reference/V: not changed (calibration value already input)

Filter: 1.4 Hz

Loop Gain: 16

The data image of the surface profile was analyzed by the accompanying Win SPM Processing, and a mode for analyzing surface roughness was used.

In addition, the measurement method using the scanning probe microscope "E-sweep" (manufactured by Hitachi High-Tech Corporation) is as described below. A scanning operation was continuously performed on the surface of each of the samples of the electrophotographic photosensitive member cut out into a 5 mm square as described above, and an analysis image of the data surface profile was output. The image of the surface profile and the surface height data included in the image were analyzed through use of the accompanying software. Thus, height information at a resolution obtained by dividing a 10 μm square of a sample cut out for measurement into 262,144 (512×512) parts was acquired. The resultant height information was output to a CSV file, and was used as calculable three-dimensional surface profile data z (x, y). The resultant z (x, y) is analyzed by the above-mentioned method, and the analysis results for the three samples of each electrophotographic photosensitive member are averaged. Thus, Rmkmax and Lmax can be calculated.

Observation Conditions of "E-sweep"

Cantilever: SI-DF20 (AL is present on a back surface) K-A102002771 (manufactured by Hitachi High-Tech Fielding Corporation)

Scanning probe microscope: manufactured by Hitachi High-Tech Science Corporation Measurement unit: E-sweep Measurement mode: DFM (resonance mode) shape image Resolution: X data number: 512, Y data number: 512

Measurement frequency: 127 Hz

A Q-curve measurement magnification, an excitation voltage, a low-pass filter, a high-pass filter, and the like were adjusted so as to be capable of optimizing the resonance state of the cantilever.

<Method of Measuring Thickness of Each Layer>

The thicknesses of the respective layers of each of the electrophotographic photosensitive members of Examples and Comparative Examples except a surface layer and a charge-generating layer were determined by a method including using an eddy current-type thickness meter (Fischerscope, manufactured by Fischer Instruments K.K.), or a method including converting the mass of the layer per unit area into a specific gravity. The thickness of the charge-generating layer was measured by converting the Macbeth density value of the photosensitive member with a calibration curve obtained in advance from: a Macbeth density value measured by pressing a spectral densitometer (product name: X-Rite 504/508, manufactured by X-Rite, Inc.) against the surface of the photosensitive member; and the value of the thickness of the layer measured through the observation of a sectional SEM image thereof. The results are shown in Tables 3-1 and 3-2.

TABLE 3-1

| Electrophotographic photosensitive member No. | Coating liquid No. for surface layer | P/B [—] | Rmkmax [nm] | Lmax [nm] | Thickness [μm] | Particle diameter [nm] |
|---|---|---|---|---|---|---|
| 1 | 1 | 2.2 | 43 | 264 | 1.0 | 170 |
| 2 | 2 | 2.2 | 43 | 500 | 1.0 | 170 |
| 3 | 3 | 2.2 | 43 | 387 | 1.0 | 170 |
| 4 | 4 | 2.2 | 43 | 233 | 1.0 | 170 |
| 5 | 5 | 2.2 | 43 | 188 | 1.0 | 170 |
| 6 | 6 | 2.2 | 43 | 211 | 1.0 | 170 |
| 7 | 7 | 2.2 | 39 | 264 | 2.0 | 170 |
| 8 | 8 | 1.6 | 36 | 210 | 2.5 | 170 |
| 9 | 9 | 1.3 | 34 | 178 | 3.0 | 170 |

TABLE 3-1-continued

| Electrophotographic photosensitive member No. | Coating liquid No. for surface layer | P/B [—] | Rmkmax [nm] | Lmax [nm] | Thickness [μm] | Particle diameter [nm] |
|---|---|---|---|---|---|---|
| 10 | 10 | 2.2 | 46 | 264 | 0.5 | 170 |
| 11 | 11 | 2.2 | 47 | 264 | 0.3 | 170 |
| 12 | 12 | 0.7 | 68 | 163 | 1.5 | 300 |
| 13 | 13 | 0.7 | 70 | 238 | 1.5 | 500 |
| 14 | 14 | 1.3 | 30 | 110 | 1.5 | 80 |
| 15 | 15 | 1.3 | 30 | 100 | 1.5 | 50 |
| 16 | 16 | 1.0 | 37 | 144 | 2.0 | 170 |
| 17 | 17 | 0.5 | 36 | 101 | 2.0 | 170 |
| 18 | 18 | 1.6 | 38 | 204 | 2.0 | 170 |
| 19 | 19 | 2.9 | 39 | 330 | 2.0 | 170 |
| 20 | 20 | 2.4 | 39 | 287 | 2.0 | 170 |
| 21 | 21 | 0.7 | 58 | 198 | 1.5 | 500 |
| 22 | 22 | 1.6 | 38 | 291 | 2.0 | 170 |
| 23 | 23 | 2.2 | 39 | 264 | 2.0 | 170 |
| 24 | 24 | 2.2 | 39 | 264 | 2.0 | 170 |
| 25 | 25 | 2.6 | 43 | 201 | 1.0 | 100 |
| 26 | 26 | 2.6 | 43 | 201 | 1.0 | 100 |
| 27 | 27 | 2.6 | 43 | 201 | 1.0 | 100 |
| 28 | 28 | 2.2 | 46 | 276 | 1.0 | 180 |
| 29 | 29 | 2.2 | 43 | 264 | 1.0 | 170 |
| 30 | 30 | 2.2 | 43 | 264 | 1.0 | 170 |
| 31 | 31 | 2.2 | 43 | 658 | 1.0 | 170 |
| 32 | 32 | 3.5 | 45 | 397 | 1.0 | 170 |
| 33 | 33 | 2.2 | 127 | 678 | 1.0 | 500 |
| 34 | 34 | 2.2 | 76 | 427 | 1.0 | 300 |
| 35 | 35 | 3.3 | 24 | 264 | 2.0 | 100 |
| 36 | 36 | 0.4 | 22 | 93 | 1.0 | 170 |
| 37 | 37 | 3.5 | 40 | 392 | 2.0 | 170 |
| 38 | 38 | 0.6 | 6 | 2,604 | 3.5 | 31 |
| 39 | 39 | 0.7 | 406 | 867 | 2.5 | 2,000 |
| 40 | 40 | 0.1 | 30 | 410 | 3.0 | 500 |
| 41 | 41 | 6.8 | 68 | 488 | 4.0 | 400 |

TABLE 3-2

| Electrophotographic photosensitive member No. | DA [nm] | DB [nm] | DA/DB [—] | Kind of particles | Kind or resin | Number of functional groups |
|---|---|---|---|---|---|---|
| 1 | 170 | 80 | 2.1 | Silica | Acrylic | 6 |
| 2 | 170 | 80 | 2.1 | Silica | Acrylic | 6 |
| 3 | 170 | 80 | 2.1 | Silica | Acrylic | 6 |
| 4 | 170 | 80 | 2.1 | Silica | Acrylic | 6 |
| 5 | | 80 | 2.1 | Silica | Acrylic | 6 |
| 6 | 170 | 80 | 2.1 | Silica | Acrylic | 6 |
| 7 | 170 | 80 | 2.1 | Silica | Acrylic | 6 |
| 8 | 170 | 80 | 2.1 | Silica | Acrylic | 6 |
| 9 | 170 | 80 | 2.1 | Silica | Acrylic | 6 |
| 10 | 170 | 80 | 2.1 | Silica | Acrylic | 6 |
| 11 | 170 | 80 | 2.1 | Silica | Acrylic | 6 |
| 12 | 300 | 170 | 1.8 | Silica | Acrylic | 6 |
| 13 | 500 | 10 | 50.0 | Silica | Acrylic | 6 |
| 14 | 80 | 10 | 8.0 | Silica | Acrylic | 6 |
| 15 | 50 | 10 | 5.0 | $TiO_2$ | Acrylic | 6 |
| 16 | 170 | 80 | 2.1 | Silica | Acrylic | 6 |
| 17 | 170 | 80 | 2.1 | Silica | Acrylic | 6 |
| 18 | 170 | 80 | 2.1 | Silica | Acrylic | 6 |
| 19 | 170 | 80 | 2.1 | Silica | Acrylic | 6 |
| 20 | 170 | 80 | 2.1 | Silica | Acrylic | 6 |
| 21 | 500 | 10 | 50.0 | Silica | Acrylic | 6 |
| 22 | 170 | 50 | 3.4 | Silica | Acrylic | 6 |
| 23 | 170 | 30 | 5.7 | Silica | Acrylic | 6 |
| 24 | 170 | 10 | 17.0 | Silica | Acrylic | 6 |
| 25 | 100 | 80 | 1.3 | Silica | Acrylic | 6 |
| 26 | 100 | 90 | 1.1 | Silica | Acrylic | 6 |
| 27 | 100 | 80 | 1.3 | Melamine resin | Acrylic | 6 |
| 28 | 180 | 80 | 2.3 | $TiO_2$ | Acrylic | 6 |
| 29 | 170 | 80 | 2.1 | Silica | Acrylic | 2 |
| 30 | 170 | 80 | 2.1 | Silica | Acrylic | 1.5 |
| 31 | 170 | 80 | 2.1 | Silica | Acrylic | 6 |
| 32 | 170 | 80 | 2.1 | Silica | Acrylic | 6 |
| 33 | 500 | 80 | 6.3 | Silica | Acrylic | 6 |
| 34 | 300 | 80 | 3.8 | Silica | Acrylic | 6 |

TABLE 3-2-continued

| Electrophotographic photosensitive member No. | DA [nm] | DB [nm] | DA/DB [—] | Kind of particles | Kind or resin | Number of functional groups |
|---|---|---|---|---|---|---|
| 35 | 100 | 30 | 3.3 | Silica | Acrylic | 6 |
| 36 | 170 | 80 | 2.1 | Silica | Acrylic | 6 |
| 37 | 170 | 80 | 2.1 | Silica | Acrylic | 6 |
| 38 | 31 | — | — | Alumina | Acrylic | 6 |
| 39 | 2,000 | 500 | 4.0 | Silica | Polycarbonate | — |
| 40 | 500 | — | — | Silicone | Acrylic | 3 |
| 41 | 400 | 400 | 1.0 | Resin | Melamine resin | — |

<Evaluation of Initial Transferability>

A reconstructed machine of a commercially available laser beam printer "i-SENSYS LBP 673 Cdw" manufactured by Canon Inc. was used. The reconstructed machine used in the evaluation was reconstructed so that an image exposure amount, the amount of a current flowing from a charging roller to the support of an electrophotographic photosensitive member (hereinafter also referred to as "total current"), a voltage to be applied to the charging roller, and a bias to be applied in the transferring step were each able to be regulated and measured.

In addition, the process cartridge for a cyan color of the above-mentioned reconstructed machine was reconstructed, and a potential probe (model 6000B-8: manufactured by Trek Japan) was mounted at its development position. Next, a surface potentiometer (model 344: manufactured by Trek Japan) was used to enable the measurement of a surface potential at the central portion of the electrophotographic photosensitive member.

The cyan toner cartridge for the evaluation machine "i-SENSYS LBP 673 Cdw" and the electrophotographic photosensitive members 1 to 28 were left to stand under a normal-temperature and normal-humidity environment (25° C., 50% RH; hereinafter also referred to as "under a N/N environment") for 24 hours.

Next, various conditions were adjusted so that a dark portion potential was −500 V and a light portion potential was −100 V by measuring the surface potential of the produced electrophotographic photosensitive member. The toner cartridge after 24 hours of the standing under the environment was mounted on the above-mentioned evaluation machine, and an image having a print percentage of 2.0% was output on up to 30 sheets of A4 paper under the N/N environment as follows: margins each having a width of 50 mm were arranged on the left and right sides of the paper, and the image was output on the central portion of the paper in its horizontal direction. Plain paper CS-680 (68 $g/m^2$) (Canon Marketing Japan Inc.) was used as the paper.

Next, an entire solid image having a width of 30 mm was output on the plain paper CS-680 in the vertical direction of the paper. The output at the time of the formation of the solid image was stopped, and transfer residual toner on the electrophotographic photosensitive member was collected by: being taped with an adhesive transparent tape (Polyester tape 5511, NICHIBAN Co., Ltd.) made of transparent polyester; and then peeling the adhesive transparent tape off. The density of the transfer residual toner was measured by the following method. The transparent tape, which had been peeled from the surface of the electrophotographic photosensitive member and had collected the transfer residual toner, and a brand-new transparent tape were each bonded onto high white paper (GF-C081, Canon Inc.). Then, the density of the transparent tape in the portion from which the transfer residual toner had been collected and the density of the brand-new transparent tape portion were each measured five times with an X-Rite color reflection densitometer (manufactured by X-Rite, Inc., X-Rite 500 Series). With regard to the averages of the measured values, the density of the transparent tape in the portion from which the transfer residual toner had been collected and the density of the brand-new transparent tape portion are indicated by D1 and D0, respectively.

The difference "D1−D0" obtained by the measurement was adopted as the density of the transfer residual toner. A smaller numerical value of the transfer residual toner density means that the amount of the transfer residual toner is smaller. The transferability was judged from the transfer residual toner density as described below. The resultant transfer residual density was ranked on 5 stages of from A to E based on the following criteria. The ranks A to D out of the ranks were each regarded as the rank at which the effects of the present invention were expressed. The results are shown in Table 4.

(Evaluation Criteria)

A: The transfer residual density is less than 0.020.
B: The transfer residual density is 0.020 or more and less than 0.040.
C: The transfer residual density is 0.040 or more and less than 0.070.
D: The transfer residual density is 0.070 or more and less than 0.10.
E: The transfer residual density is 0.10 or more.

<Evaluation of Transferability after Endurance>

After the taping evaluation of the transfer residual toner was performed, an image having a print percentage of 2.0% was output on up to 10,000 sheets of A4 paper under the N/N environment as follows: margins each having a width of 50 mm were arranged on the left and right sides of the paper, and the image was output on the central portion of the paper in its horizontal direction, and then, the transfer residual toner was evaluated by taping in the same manner as in the above-mentioned <Evaluation of Transferability> in the above-mentioned <Evaluation of Initial Transferability>. The resultant transfer residual density was subtracted from the transfer residual density for evaluation of the initial transferability to provide a change in transfer residual density after endurance, and was ranked on 5 stages of from A to E as described below. The ranks A to D were each determined as the rank at which the effects of the present invention were exhibited. The results are shown in Table 4.

A: The change in transfer residual density is less than 0.010.
B: The change in transfer residual density is 0.010 or more and less than 0.020.
C: The change in transfer residual density is 0.020 or more and less than 0.040.
D: The change in transfer residual density is 0.050 or more and less than 0.060.

E: The change in transfer residual density is 0.060 or more.

<Evaluation of Density Unevenness>

Next, an electrophotographic photosensitive member different from the one subjected to the evaluation of transferability after endurance was mounted on the reconstructed machine. An image having a print percentage of 2.0% was output on up to 30 sheets of A4 paper under the N/N environment as follows: margins each having a width of 50 mm arranged on the left and right sides of the paper, and the image was output on the central portion of the paper in its horizontal direction. Plain paper CS-680 (68 g/$m^2$) (Canon Marketing Japan Inc.) was used as the paper. After that, a halftone (20H) image was formed, and the density unevenness of this image was evaluated based on the following criteria. Plain paper CS-680 (68 g/$m^2$) (Canon Marketing Japan Inc.) was used as the paper. The 20H image is a halftone image that uses values expressed in 256 gradations represented in hexadecimal format in which 00H is solid white (non-image) and FFH is solid black (full image).

As the evaluation criteria for the density unevenness, the density unevenness was evaluated based on the following criteria. Density measurement was performed at 20 locations, and determination was performed as described below from the value of the difference in density between the maximum value and the minimum value (defined as a density uniformity). The density was measured with an X-Rite color reflection densitometer (manufactured by X-Rite, Inc., X-Rite 500 Series). The results are shown in Table 4.

(Evaluation Criteria)

A: The density uniformity is less than 0.04.

B: The density uniformity is 0.04 or more and less than 0.10.

C: The density uniformity is 0.10 or more and less than 0.20.

D: The density uniformity is 0.20 or more and less than 0.30.

E: The density uniformity is 0.30 or more.

TABLE 4

| | | | | Transferability after endurance | | | |
|---|---|---|---|---|---|---|---|
| | | Initial transferability | | Change in | | Density unevenness | |
| | Electrophotographic photosensitive member No. | Rank | Transfer residual density [—] | Rank | transfer residual density [—] | Rank | Density uniformity [—] |
| Example 1 | 1 | A | 0.010 | A | 0.004 | A | 0.03 |
| Example 2 | 2 | A | 0.015 | A | 0.006 | D | 0.28 |
| Example 3 | 3 | A | 0.012 | A | 0.006 | C | 0.18 |
| Example 4 | 4 | A | 0.015 | A | 0.008 | A | 0.02 |
| Example 5 | 5 | B | 0.020 | A | 0.004 | A | 0.02 |
| Example 6 | 6 | A | 0.009 | A | 0.008 | A | 0.02 |
| Example 7 | 7 | A | 0.018 | A | 0.008 | B | 0.08 |
| Example 8 | 8 | B | 0.021 | A | 0.006 | A | 0.03 |
| Example 9 | 9 | B | 0.024 | A | 0.004 | A | 0.03 |
| Example 10 | 10 | A | 0.012 | C | 0.036 | A | 0.03 |
| Example 11 | 11 | A | 0.010 | D | 0.044 | A | 0.03 |
| Example 12 | 12 | C | 0.055 | C | 0.028 | B | 0.08 |
| Example 13 | 13 | D | 0.075 | C | 0.020 | B | 0.05 |
| Example 14 | 14 | C | 0.062 | A | 0.004 | B | 0.05 |
| Example 15 | 15 | D | 0.072 | A | 0.004 | B | 0.05 |
| Example 16 | 16 | B | 0.023 | C | 0.020 | A | 0.03 |
| Example 17 | 17 | C | 0.068 | D | 0.050 | A | 0.03 |
| Example 18 | 18 | A | 0.007 | A | 0.006 | A | 0.03 |
| Example 19 | 19 | A | 0.010 | C | 0.034 | B | 0.09 |
| Example 20 | 20 | A | 0.008 | A | 0.008 | B | 0.08 |
| Example 21 | 21 | D | 0.075 | C | 0.020 | B | 0.05 |
| Example 22 | 22 | A | 0.013 | A | 0.007 | A | 0.03 |
| Example 23 | 23 | A | 0.010 | B | 0.013 | A | 0.03 |
| Example 24 | 24 | B | 0.020 | C | 0.021 | A | 0.03 |
| Example 25 | 25 | B | 0.033 | A | 0.002 | A | 0.03 |
| Example 26 | 26 | C | 0.044 | A | 0.002 | A | 0.03 |
| Example 27 | 27 | D | 0.071 | C | 0.022 | A | 0.03 |
| Example 28 | 28 | C | 0.065 | A | 0.004 | A | 0.03 |
| Example 29 | 29 | B | 0.022 | B | 0.012 | A | 0.03 |
| Example 30 | 30 | B | 0.025 | C | 0.023 | A | 0.03 |
| Comparative Example 1 | 31 | B | 0.035 | A | 0.002 | E | 0.38 |
| Comparative Example 2 | 32 | A | 0.010 | D | 0.055 | B | 0.08 |
| Comparative Example 3 | 33 | E | 0.112 | A | 0.005 | E | 0.42 |
| Comparative Example 4 | 34 | E | 0.105 | A | 0.003 | C | 0.15 |
| Comparative Example 5 | 35 | E | 0.110 | C | 0.025 | A | 0.03 |
| Comparative Example 6 | 36 | E | 0.122 | C | 0.033 | E | 0.31 |
| Comparative Example 7 | 37 | A | 0.008 | E | 0.075 | D | 0.25 |
| Comparative Example 8 | 38 | E | 0.115 | B | 0.018 | E | 0.34 |
| Comparative Example 9 | 39 | C | 0.044 | B | 0.011 | F | 0.38 |
| Comparative Example 10 | 40 | B | 0.028 | F | 0.082 | D | 0.24 |
| Comparative Example 11 | 41 | B | 0.022 | F | 0.098 | C | 0.16 |

According to the present invention, there can be provided an electrophotographic photosensitive member in which the durability is improved by suppressing the detachment of the particles from the surface layer while the transferability is improved by controlling the distance between the particles contained in the surface layer to reduce the adhesive force of the toner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic photosensitive member comprising a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a scanning probe microscope, satisfy the following formulae (i) and (ii), $$30 \leq Rmk\max \leq 70 \quad \text{(i)}$$

$$100 \leq L\max \leq 500. \quad \text{(ii)}$$

2. The electrophotographic photosensitive member according to claim 1, wherein the surface layer has a thickness of 0.5 μm or more and 2.0 μm or less, and wherein the particle have a number-based average primary particle diameter of 80 nm or more and 350 nm or less.

3. The electrophotographic photosensitive member according to claim 1, wherein the value of the ratio of the total volume of the particle occupying the surface layer to the volume of the binder resin occupying the surface layer is 1.0 or more and 3.0 or less.

4. The electrophotographic photosensitive member according to claim 1, wherein the maximum value Rmkmax satisfies the following formula (i)', $$30 \leq Rmk\max \leq 60. \quad \text{(i)'}$$

5. The electrophotographic photosensitive member according to claim 1, wherein the calculated length Lmax satisfies the following formula (ii)', $$100 \leq L\max \leq 400. \quad \text{(ii)'}$$

6. The electrophotographic photosensitive member according to claim 1, wherein the surface layer contains, as the particle, an inorganic particle A and an inorganic particle B having different number-based average primary particle diameters, and wherein, when the number-based average primary particle diameter of the inorganic particle A is represented by DA [nm], and the number-based average primary particle diameter of the inorganic particle B is represented by DB [nm], the DA and the DB satisfy the following formulae (iii) and (iv), $$1.2 \leq DA/DB \leq 4.0 \quad \text{(iii)}$$

$$80 \leq DA \leq 350. \quad \text{(iv)}$$

7. The electrophotographic photosensitive member according to claim 6, wherein the inorganic particle A are a silica particle.

8. The electrophotographic photosensitive member according to claim 1, wherein the binder resin is a polymerization product of a composition containing a polymerizable monomer having a polymerizable functional group, and wherein the composition contains, as the polymerizable monomer, a polymerizable monomer A having 6 or more polymerizable functional groups.

9. The electrophotographic photosensitive member according to claim 8, wherein the polymerizable monomer A is a (meth)acrylic monomer having 6 or more polymerizable functional groups.

10. A process cartridge comprising at least one unit selected from the group consisting of: a charging unit; a developing unit; and a cleaning unit, the process cartridge integrally supporting the at least one unit and being detachably attachable onto a main body of an electrophotographic apparatus, the process cartridge including an electrophotographic photosensitive member, wherein the electrophotographic photosensitive member includes a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a scanning probe microscope, satisfy the following formulae (i) and (ii), $$30 \leq Rmk\max \leq 70 \quad \text{(i)}$$

$$100 \leq L\max \leq 500. \quad \text{(ii)}$$

11. An electrophotographic apparatus comprising:

a electrophotographic photosensitive member;

a charging unit;

an exposing unit;

a developing unit; and a transfer unit, wherein the electrophotographic photosensitive member includes a surface layer containing a binder resin and a particle, wherein a value of a ratio of a total volume of the particle occupying the surface layer to a volume of the binder resin occupying the surface layer is 0.50 or more and 3.0 or less, and wherein a maximum value Rmkmax [nm] of an averaged sectional difference of elevation Rmk and a calculated length Lmax [nm] when the maximum value Rmkmax is taken, which are obtained by measuring a surface of the surface layer with a scanning probe microscope, satisfy the following formulae (i) and (ii), $$30 \leq Rmk\text{max} \leq 70 \quad \text{(i)}$$

$$100 \leq L\text{max} \leq 500. \quad \text{(ii)}$$

* * * * *